US009842322B2

(12) United States Patent
Johnston et al.

(10) Patent No.: US 9,842,322 B2
(45) Date of Patent: Dec. 12, 2017

(54) CENTRALIZED FINANCIAL ACCOUNT MIGRATION SYSTEM

(71) Applicant: The Fusion Network LLC, Eagan, MN (US)

(72) Inventors: Cale T. Johnston, Eagan, MN (US); Hunter Wolfe, Ivins, UT (US); Michael J. Stromberg, Baxter, MN (US); Anthony Loosbrock, Brainerd, MN (US)

(73) Assignee: ClickSWITCH, LLC, Minneapolis, MN (US)

( * ) Notice: Subject to any disclaimer, the term of this patent is extended or adjusted under 35 U.S.C. 154(b) by 1 day.

(21) Appl. No.: 14/618,746

(22) Filed: Feb. 10, 2015

(65) Prior Publication Data

US 2015/0154569 A1    Jun. 4, 2015

Related U.S. Application Data

(63) Continuation of application No. 14/542,299, filed on Nov. 14, 2014, which is a continuation-in-part of application No. 14/081,587, filed on Nov. 15, 2013.

(60) Provisional application No. 62/018,364, filed on Jun. 27, 2014.

(51) Int. Cl.
*G06Q 20/02* (2012.01)
*G06Q 20/10* (2012.01)
*G06Q 20/42* (2012.01)
*G06Q 40/02* (2012.01)

(52) U.S. Cl.
CPC .......... *G06Q 20/023* (2013.01); *G06Q 20/10* (2013.01); *G06Q 20/42* (2013.01); *G06Q 40/02* (2013.01)

(58) Field of Classification Search
CPC ................................ G06C 20/10; G06C 20/40
USPC ........................................................... 705/44
See application file for complete search history.

(56) References Cited

U.S. PATENT DOCUMENTS

| 6,721,716 B1 | 4/2004 | Gross |
| 7,844,519 B2 | 11/2010 | Wehunt et al. |
| 8,055,564 B2 | 11/2011 | Wehunt et al. |
| 8,392,305 B2 | 3/2013 | Wehunt et al. |

(Continued)

OTHER PUBLICATIONS

Office Action dated Feb. 13, 2015 in U.S. Appl. No. 14/081,587, 26 pages.

(Continued)

*Primary Examiner* — Jagdish N Patel
*Assistant Examiner* — Liz P Nguyen
(74) *Attorney, Agent, or Firm* — Merchant & Gould P.C.

(57) ABSTRACT

Systems and methods for migration of financial account settings are disclosed. One system includes a migration server. The migration server includes a third-party interface directory, including notification data associated with notifying one or more third parties of an account migration. The migration server further includes a transaction analysis module configured to parse transaction histories associated with an existing financial account to identify a third party that has initiated at least one transaction with the existing financial account. The migration server also includes a notification module configured to generate a notification for the identified third party based on notification data associated with the identified third party stored in the third-party interface directory and information associated with a target financial account.

16 Claims, 27 Drawing Sheets

(56) References Cited

U.S. PATENT DOCUMENTS

| | | | |
|---|---|---|---|
| 8,793,174 B1 | 7/2014 | Wehunt | |
| 2007/0083917 A1* | 4/2007 | Peterson | G06F 21/31 726/5 |
| 2007/0198402 A1* | 8/2007 | Ruttenberg et al. | 705/39 |
| 2009/0112746 A1* | 4/2009 | Fong | 705/35 |
| 2010/0223160 A1* | 9/2010 | Brown | G06Q 20/102 705/26.1 |
| 2011/0218905 A1* | 9/2011 | Zeringue | 705/38 |
| 2012/0011071 A1 | 1/2012 | Pennock | |
| 2012/0109805 A1* | 5/2012 | Ramachandra et al. | 705/35 |
| 2013/0024367 A1 | 1/2013 | Bellefeuille et al. | |
| 2014/0164223 A1* | 6/2014 | Grigg | G06Q 30/06 705/39 |

OTHER PUBLICATIONS

Office Action dated Mar. 12, 2015 in U.S. Appl. No. 14/542,299, 23 pages.

Office Action dated Mar. 25, 2016 in U.S. Appl. No. 14/542,299, 29 pages.

Office Action dated Apr. 11, 2016 in U.S. Appl. No. 14/081,587, 33 pages.

* cited by examiner

1422

Migration Request Form Preview

*Fusion Energy*

Auto Pay Application
Auto pay is a free service that makes paying your energy bill easier. Just print this page, fill out the form completely, include a voided check or deposit slip and mail or fax it to us.

1424

Personal Information (please print)
   Name: _John D. Jones_
   *Fusion Energy* Account Number: _789876_
   Address: _3 West Main St._
   City: _Duluth_   State: _MN_   Zip: _55802_

1426

Financial Information (please print)
   Name of Bank/Financial Institution: _Fusion Bank_
Please withdraw payments directly from my:
   [X] Checking Account (include voided check)
   [ ] Savings Account (include voided deposit slip)
   Bank/Financial Institution Acct. #: _6565033_
   Routing (ABA) Number: _992320322_

I authorize Fusion Energy to initiate transfers from my designated account to make monthly payments on my Fusion Energy account. This authority will remain in effect until I notify Fusion Energy.
Authorized Signature: _____

1428

[ Sign ]  [ Edit ]  [ Cancel ]

Account Closures

| Financial Institution | Nickname | Acct. # | Acct. Type | Close Date | Status |
|---|---|---|---|---|---|
| Deerwood Bank | John's Old Acct. | x1234 | checking | 8/6/2014 | Subm... |
| Wings Financial | Sally's Old Acct. | x3456 | checking | 6/25/2014 | Subm... |

Submit

CENTRALIZED FINANCIAL ACCOUNT MIGRATION SYSTEM

CROSS REFERENCE TO RELATED APPLICATION

This application is a continuation of U.S. Ser. No. 14/542,299, titled CENTRALIZED FINANCIAL ACCOUNT MIGRATION SYSTEM, filed on Nov. 14, 2014, which is a continuation-in-part of U.S. Ser. No. 14/081,587, titled CENTRALIZED FINANCIAL ACCOUNT MIGRATION SYSTEM, filed on Nov. 15, 2013, which claims priority to U.S. Provisional Application Ser. No. 62/018,364, titled CENTRALIZED FINANCIAL ACCOUNT MIGRATION SYSTEM, filed Jun. 27, 2014, the disclosures of which are hereby incorporated by reference in their entirety.

BACKGROUND

Financial institutions are increasingly allowing customers to directly access and manage account information. For example, customers can manage one-time or recurring funds transfers, pay bills, set up automated withdrawals, or authorize Automated Clearing House (ACH) transactions for a particular customer account. Typically, this is allowed at automated teller machines (ATMs) or via an online portal at which customer data can be accessed (for example, via a web browser).

When a customer moves from one bank to another, however, some problems can arise. Transferring bank account information from one or more financial institutions to a new financial institution require customers to manually close their old bank accounts and to manually reestablish previously existing services at their new bank accounts. Under the new bank accounts, customers manually reestablish information, such as their list of bill pay payees, bill pay payment schedule, scheduled transfers, electronic bills ("eBills"), and automatic debits and credits. The process of manually reestablishing old bank account services at the new bank account can be inefficient and can waste time, energy, and resources. Furthermore, it can be difficult for customers to remember to establish such bank account services, in particular for payment occurrences which occur relatively infrequently (e.g., semi-annually, annually, or less frequently or erratically).

In some cases, financial institutions have attempted to at least partially automate a process by which new customers can import settings for such automated services from a prior account into a new account. However, even such systems have drawbacks. For example, such systems often are able to detect and import bill pay information or other types of transactions originating at the former account, but they are not as able to detect cases in which third party automated transfers would occur, such as in the case of an Automated Clearing House (ACH) transaction. This is because such transactions are not represented within the settings of an account at the financial institution but are instead managed by that third party (e.g., a utility provider). From the perspective of the former financial institution, such ACH or other third-party originated transactions are only reflected in a transaction history for that account.

Furthermore, existing attempts by financial institutions to automate importation of settings for such bill pay services are also limited in terms of the flexibility of the services provided. Typically, if a financial institution provides such settings importation services, it does so only with respect to the customer's new account at that financial institution. In other words, such solutions are not configurable to be used in connection with any desired new account at any desired new financial institution. Because financial institutions lack any motivation to provide a tool by which customers could export bank account settings (among other reasons), such tools remain unavailable from financial institutions.

For these and other reasons, improvements in the area of financial account migration are desired.

SUMMARY

In accordance with the following disclosure, the above and other issues are addressed by the following:

In a first aspect, a system for migrating financial accounts for an accountholder is disclosed. The system includes a migration server. The migration server includes a third-party interface directory, including notification data associated with notifying one or more third parties of an account migration. The migration server also includes a transaction analysis module configured to parse transaction histories associated with an existing financial account to identify a third party that has initiated at least one transaction with the existing financial account. The migration server also includes a notification module configured to generate a notification for the identified third party based on notification data associated with the identified third party stored in the third-party interface directory and information associated with a target financial account.

In a second aspect, a method for managing automated migration of financial accounts for an accountholder is disclosed. The method includes receiving identification and login information associated with an existing financial account at a migration server, and the existing financial account being associated with one or more automated funds transfers. The method also includes receiving login information associated with a target financial account. The method also includes parsing transaction histories associated with the existing financial account to identify one or more third parties that have each initiated at least one transaction with the existing financial account. The method also includes receiving at the migration server a selection by a user of one or more of the third parties. The method also includes receiving user authorization to initiate migration of the selected third parties. The method additionally includes generating notifications for the selected third parties based on notification data associated with the third parties stored in a third-party interface directory and information associated with a target financial account. The method also includes initiating migration of the selected third parties to the target financial account by extracting information associated with the selected third parties from a third-party interface directory and generating notifications for each of the selected third parties based on the information extracted from the third-party interface directory.

In a third aspect, a system for migrating financial accounts for an accountholder is disclosed. The system includes a migration server. The migration server includes a web interface configured to receive identification and login information associated with an existing financial account and identification and login information associated with a target financial account. The migration server also includes a transaction analysis module configured to parse transaction histories associated with an existing financial account to identify a plurality of third parties that have each initiated at least one transaction with the existing financial account, wherein the at least one transaction is an Automated Clearing House (ACH) transaction or a direct deposit transaction.

The migration server also includes a migration confirmation module configured to display the identified plurality of third parties and receive a selection of one or more third parties from the plurality of third parties for migration to the target account. The migration server additionally includes a third-party interface directory, including notification data associated with notifying one or more third parties of an account migration. The migration server also includes a notification module configured to generate a notification for the identified third party based on notification data associated with the identified third party stored in the third-party interface directory and information associated with a target financial account, wherein the information associated with the target financial account comprises a bank routing number and an account number. The migration server additionally includes a third party migration database for tracking third party transaction migrations, including records associated with the selected one or more third parties, the records including a migration confirmation field for recording whether the migration for an associated third party has been confirmed. The migration server also includes a migration module configured to transfer funds from the existing financial account to the target account, wherein the migration module retains at least a portion of the funds in the existing financial account for a period of time after initiation of the migration to fulfill transactions likely to occur after initiation of the migration; the at least a portion of the funds calculated based on the migration confirmation field in the records in the third party migration database.

In another aspect, a system for migration of financial account settings is disclosed. The system includes a migration server. The migration server includes a database for tracking account settings migration including one or more switch tracking numbers associated with account migrations. The migration server further includes a web interface configured to receive from a user a switch tracking number, identification and login information associated with one or more existing financial accounts, and login information associated with a target financial account. The migration server also includes a transaction analysis module configured to parse transaction histories associated with each of the existing financial accounts to determine one or more likely automated funds transfers associated with each of the one or more existing financial accounts. The migration server further includes a migration module configured to initiate a migration of one or more likely automated funds transfers associated with each of the existing financial accounts.

In yet another aspect, a method for managing automated migration of account settings between financial accounts is disclosed. The method includes receiving identification and login information associated with one or more existing financial accounts at a migration server, each of the one or more existing financial accounts including one or more automated funds transfers associated therewith. The method also includes receiving login information associated with a target financial account to which account settings are to be migrated. The method further includes parsing transaction histories associated with each of the one or more existing financial accounts to determine one or more likely automated funds transfers associated with each of the one or more existing financial accounts, and receiving at the migration server a selection by a user of one or more of the likely automated funds transfers. The method includes receiving user authorization to initiate migration of the selected automated funds transfers, and initiating migration of the selected automated funds transfers to the target financial account by extracting information associated with the selected automated funds transfers from the one or more existing financial accounts and creating corresponding automated funds transfers associated with the target financial account. The method also includes tracking the migration of the selected automated funds transfers in a database at the migration server, the migration of the selected automated funds transfers associated with a switch tracking number generated by the migration server.

In an additional aspect, a method for migrating account settings between financial accounts is disclosed. The method includes providing login information and institution information associated with one or more existing financial accounts into a user interface provided from a migration server, each of the one or more existing financial accounts including one or more automated funds transfers associated therewith. The method also includes providing login information associated with a target financial account to which account settings are to be migrated into the user interface provided from a migration server. The method further includes selecting one or more displayed automated funds transfers displayed in a user interface provided by the migration server, the displayed automated funds transfers based at least in part on an automated analysis of a transaction history of each of the one or more existing financial accounts. The method includes providing electronic approval of the selected automated funds transfers from the one or more existing financial accounts to the target financial account, thereby initiating migration of settings of the one or more existing financial accounts to the target financial account.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 20 is a schematic user interface of a migration request form preview page presented to a user by a conversion server for initiating an automated financial account settings migration, according to an example embodiment;

FIG. 23 is a schematic user interface of an account closures review page presented to a user by a conversion server for initiating an automated financial account settings migration, according to an example embodiment;

DETAILED DESCRIPTION

Figure 1:
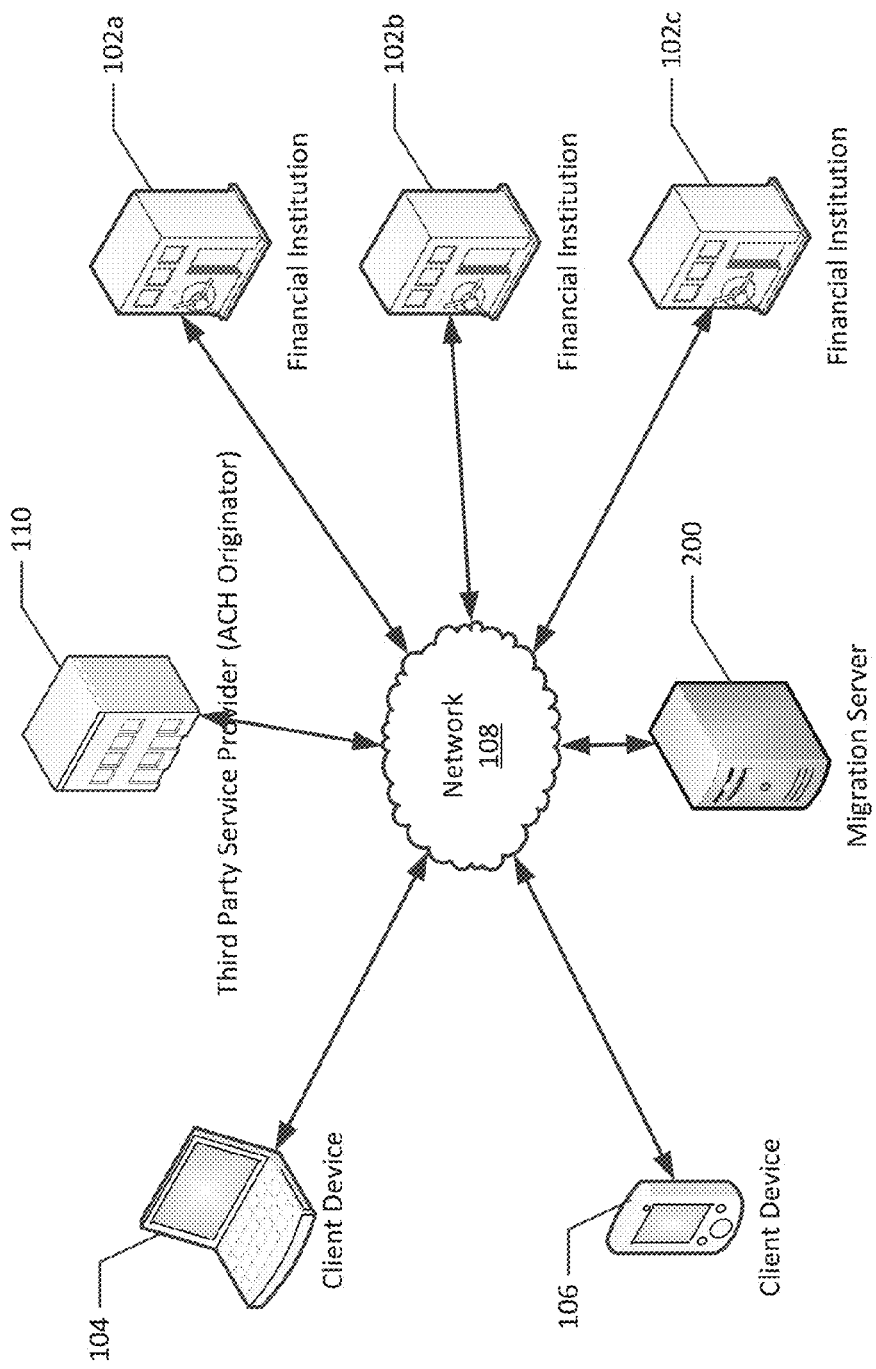
FIG. 1 illustrates an overall network in which customers can interact with new and old financial institutions and third party payment initiators, according to an example embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, the present disclosure relates to methods and systems for enabling automated migration of financial account settings from one or more existing financial accounts, including accounts at different financial institutions, to a target account at a designated financial institution. The financial accounts, as discussed herein, can include any of a variety of types of accounts that support financial transfers that are initiated either from the account itself or from external to the account, for example from an Automated Clearing House (ACH) transaction. Such accounts can include customer checking or savings accounts at banks, credit unions, or other types of financial institutions.

The methods and systems described herein provide for, in certain embodiments, a centralized migration server that can be used in connection with target accounts of different financial institutions, and can be used to migrate account settings from one or more existing accounts at a time. These include both bill pay and automatic payments (e.g., ACH transactions), which are initiated from within the account and by third parties, respectively. Accordingly, the methods and systems of the present disclosure provide a number of advantages over existing solutions. For example, the present disclosure provides for additional flexibility with respect to the institution associated with the target account, and to allow for different financial institutions to receive migrations of account settings. Additionally, the methods and systems of the present disclosure support not just those settings within a financial account such as bill pay settings, but also support analysis of transactions to determine likely third party recurring payments that are indicated in the transaction histories of the accounts from which settings are transferred. This is despite the fact that the account under analysis by the migration server may not include any indication, other than the existence of the transaction, that such a transaction may occur, and may occur with a particular frequency.

The methods and systems described herein may be provided by financial institutions to offer new and existing accountholders a fast, easy and secure way to transfer accounts from other institutions. In some embodiments, the system may provide for customization to display the logo or other information associated with a financial institution providing the service. Additionally, the system and method may be integrated with an existing financial account that can be used as the target account, such that the user does not need to enter information about the target account. Additionally, in some embodiments, the system may include an administrative portal or user interface through which the providing financial institution may view the status of and reports relating to all account switches at the financial institution.

Referring now to FIGS. 1-6, a generalized computing environment in which aspects of the present disclosure can be implemented is disclosed. FIG. 1 illustrates an overall network 100 in which customers can interact with new and old financial institutions and third party payment initiators, according to an example embodiment of the present disclosure.

In the exemplary embodiment shown, the network 100 includes a plurality of financial institutions 102. In the embodiment shown, three such financial institutions 102, shown as financial institutions 102a-c are shown; it is understood that additional financial institutions could be included in any such example network but that the three financial institutions 102a-c are depicted for purposes of simplicity. Each of the financial institutions 102a-c generally will manage a plurality of customer accounts, any may allow online access to customers to manage accounts held with those institutions. Such online access may be provided by way of an internet-based portal to view account balances, manage bill pay processes, and view transaction histories associated with such accounts. Other functionalities are typically available from such institutions (e.g., reordering checks, balance transfers, etc.) and are well known in the art.

In conjunction with the present disclosure, a plurality of clients can be allowed to access financial accounts held at one or more of the financial institutions 102a-c. In the example shown, a client using a computing system 104, or mobile device 106, could access accounts at various financial institutions by providing login information (e.g., username and password or other identifying information) to access account information. The computing system 104 or mobile device 106 can connect to a financial institution from among financial institutions 102a-c via a secure connection over a network 108, such as the Internet. Any of a variety of secure communications protocols (e.g., SSL/TLS, etc.) can be used.

In addition, a client may be a customer of a third party service or carrier, such as an insurance carrier, a cell phone carrier, or a utility (shown as third party 110). Such third parties 110 may provide a service to the client in which bills are, rather than being paid by periodic check, instead paid using an Automated Clearing House (ACH) transaction in which electronic transfer is provided based on authorization previously provided by a client/user. Such ACH transactions often take the place of traditional check-based bill payments, since they can be instituted by an entity to whom payment is owed upon authorization of the payee (i.e., the client), but do not require the lag time traditionally incurred during a check clearance process.

In the embodiment shown, a migration server 200 is also communicatively connected to the network 108. The migration server 200 generally manages a process by which automated payments, whether bill pay, ACH, or other types of payment, can be migrated from accounts associated with the client to a new account at a new financial institution 102.

Figure 2:
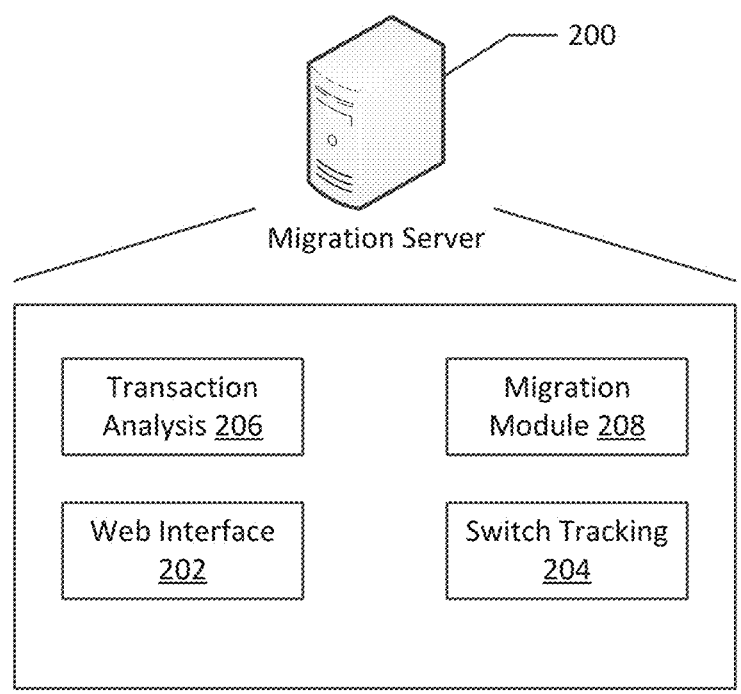
FIG. 2 illustrates a block diagram of a conversion server useable in connection with the present disclosure.

As seen in FIG. 2, the migration server 200 includes a web interface component 202 that is configured to provide a plurality of web-based user interfaces to manage processes by which account transfers can be performed. Example methods enabled by the web interface are described in connection with FIGS. 7-9, and example user interfaces are discussed in further detail below in connection with FIGS. 10-26.

The migration server 200 further includes a switch tracking module 204, which includes a database for managing and tracking account migration processes. The migration server 200 will, in some embodiments, associate a switch tracking number with a particular target account in a database internal to the migration server 200, for managing the migration process. The switch tracking number can, in various embodiments, be affiliated with target account information (e.g., an identity of the financial institution holding the target account and username/login information of the customer to whom the account is associated) as well as one or more settings to be migrated to that target account.

In connection with the present disclosure, a transaction analysis module 206 will parse transaction histories and settings of one or more existing accounts to detect various types of transactions that a customer may wish to migrate to his/her target account. The transaction analysis module 206 will access transaction histories of existing accounts identified by the customer to determine the existence of bill pay or ACH transactions. Preferably, the transaction analysis module 206 will access at least one year or more of transaction history for each of the one or more existing accounts from which to migrate settings, to allow the transaction analysis module 206 to (1) determine, for monthly or other frequent transactions, a reliable or average amount which will be expected for an ACH transaction or bill pay transaction, and (2) to detect transactions that do not occur regularly, such as bi-annual insurance payments, or annual payments of other types (e.g., property taxes, etc.). The detected recurring electronic transfers will be marked, by the transaction analysis module 206, by type, for review by the customer to determine if migration is desired.

Those transactions or transfers selected by the customer will be passed to a migration module 208, which will manage migration of those automated transfer settings from the existing accounts to the target account. The migration module 208 determines settings for bill pay transactions and establishes such bill pays at the target account. This can include, for example, setting up the bill pay, as well as receiving confirmation from the financial institution of the target account that the setup of that bill pay was successful (e.g., by receiving a confirmation message from the financial institution). Migration can also include setting up expected ACH transactions, by notifying one or more third party carriers (e.g., third parties 110) of the new destination account to which those ACH transactions are to be targeted. In such embodiments, notification of the ACH-related third parties can include a consideration of a number of factors. These include the typical day on which ACH transactions are initiated by the third party, as well as typical amounts of funds transferred as part of that transaction. Additional details regarding the migration module 208 are described below in connection with at least FIG. 3.

In accordance with the present disclosure, it is noted that although in some embodiments a settings transfer among accounts may include a funds transfer from existing accounts to the target account to ensure that funds exist in the target account to satisfy the various bill pay or ACH transactions, it is also possible that it may take some time for changes, in particular changes to ACH transactions, to take effect. As such, in accordance with the present disclosure, the migration module 208 performs a timed migration process by which at least a portion of funds is retained in existing accounts in case third parties performing ACH transactions do not update the account associated with the ACH transaction. If that account is not updated to the target account but funds are transferred to the target account, the ACH transaction will fail, with negative effects for the third party (a delay in payment) and for the customer (late fees, insufficient funds charges associated with the existing account, etc.). After a period of time, typically less than a full period between ACH transactions from a given third party, the amount of funds expected to be associated with the ACH transaction (as detected by the transaction analysis module 206) will be released, allowing for its transfer to the target account.

Figure 3:
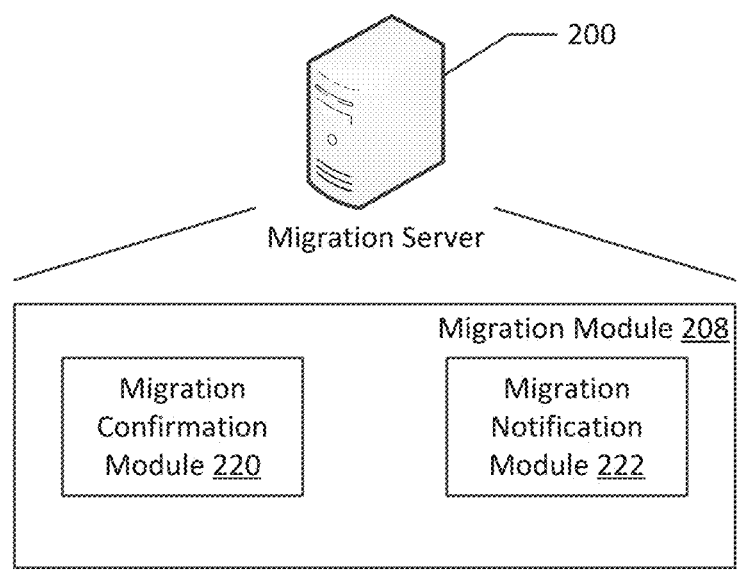
FIG. 3 illustrates a block diagram of a migration module useable in connection with the present disclosure, according to an example embodiment.

As seen in FIG. 3, embodiments of the migration module 208 include a migration confirmation module 220 and a migration notification module 222. The migration confirmation module 220 operates to generate a user interface for confirming suspected migration subjects, such as bill pay transactions and ACH transactions. FIGS. 17-19 and 22 illustrate example user interfaces generated by embodiments of the migration confirmation module 220.

The migration notification module 222 operates to generate notifications to third-parties, such as originators of ACH transactions from one or more of the customer's existing accounts. Embodiments of the migration notification module 222 are described below in greater detail at least with respect to FIG. 9.

It is noted that, although in the embodiments of FIGS. 1-3 only a single migration server 200 is shown, it is recognized that equivalently a plurality of computing systems could be used to implement the migration server 200. For example, a separate web server could implement the web interface component 202, from a database server implementing the switch tracking module 204. Other transaction servers could be used as well for the transaction analysis module 206 or the migration module 208 as well, with each of the servers used to implement the migration systems and processes of the present disclosure being communicatively interconnected. Additional details regarding the settings migration, including migration of direct deposit, bill pay, and ACH or other transactions are described below in connection with FIGS. 7-9, as well as the user interfaces of FIGS. 10-26.

Figure 4:
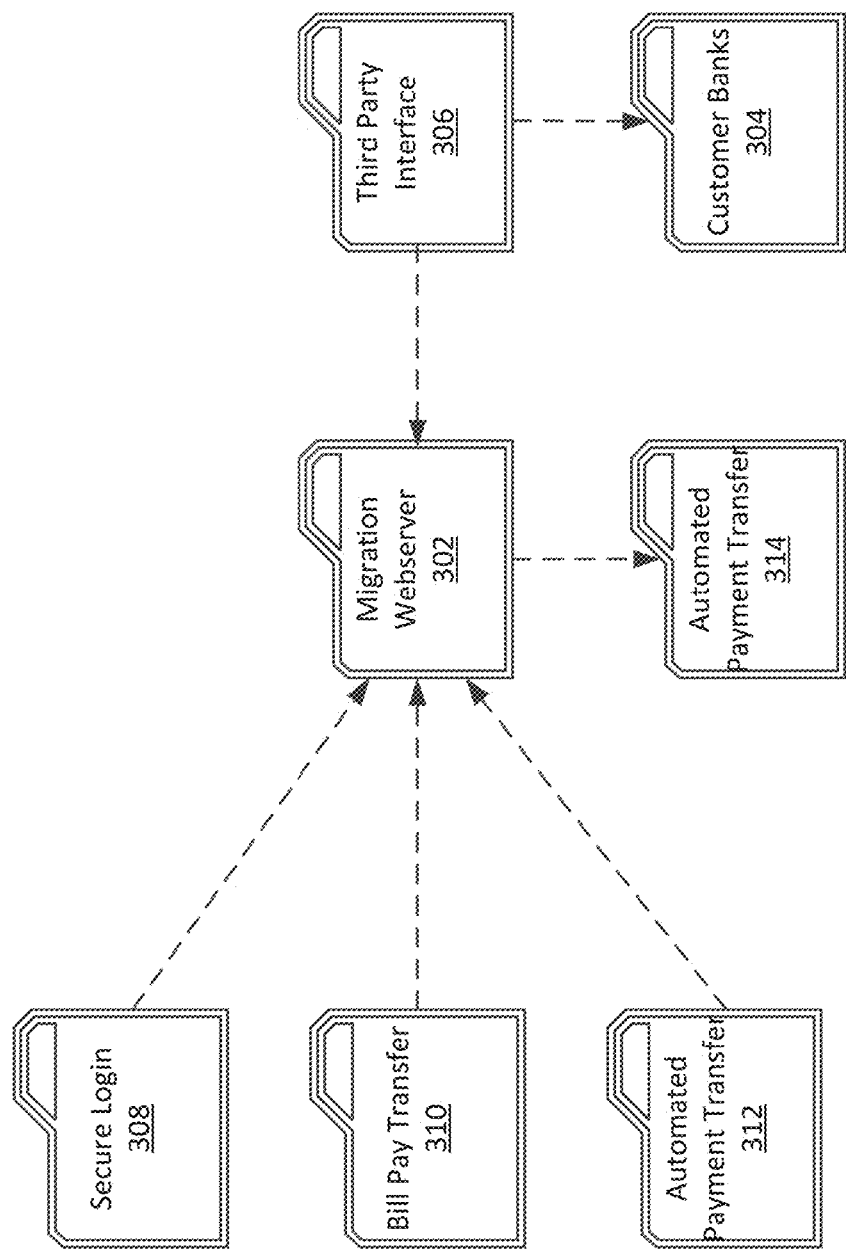
FIG. 4 illustrates an example schema illustrating data managed by the migration server to perform configurable financial settings importation processes, according to an example embodiment.

Referring now to FIG. 4, an example schema 300 illustrating data managed by the migration server to perform configurable financial settings importation processes is shown, according to an example embodiment. In the embodiment shown, the example schema 300 includes a plurality of record directories, including a migration webserver directory 302, a customer banks directory 304, and a third party interface directory 306.

The migration webserver directory 302 maintains web server files, such as screen data and security rules used to maintain secure communications with financial institutions and customers seeking to migrate accounts among such financial institutions. The customer banks directory 304 maintains a list of customer banks from whom requests for migration can be received, as well as information about those customer banks. This information can be used to determine whether to issue a switch tracking number to a particular bank, and whether to initiate a switch tracking record using the switch tracking module 204 described above.

The third party interface directory 306 provides a similar interface defining how to connect to third parties, for example to notify those third parties of changes to ACH settings (i.e., the change to a new target account from an existing account identified by the ACH settings). In some embodiments, the third party interface directory 306 also includes a biller database of forms or templates for use in notifying the third parties of the account migration. These forms may be generic forms that are applicable to multiple third parties or custom forms that are applicable to a limited number of or even a single third party. The forms may be provided by the third party (e.g., an auto pay application) or may be generated independently from the third party. Additionally, the form may comprise a plurality of fields, at least some of which may be configured to be automatically filled in with information about the customer (or accountholder) and the target financial account. This information may include one or more of the following: the customer's name, the customer's address, the customer's account number with the third party, the name of the financial institution associated with the target financial account, an account number associated with the target financial account, and a routing number associated with the target financial account. Some embodiments may include fields for additional information as well.

The schema 300 further includes a secure login directory 308, a bill pay transfer directory 310, and automated payment transfer directories 312, 314. The secure login directory 308 defines user credentials for which customers can access a switch tracking record, to allow the customer to access partially-completed migration requests, or to otherwise log in to the migration server to access historical records or to view a status of a requested migration. The user credentials can include, for example, username and password, or a switch track number and/or login credentials associated with the target financial account.

The bill pay transfer directory 310 stores information associated with pending bill pay migrations that are entered by a user and are to be migrated to new accounts. Similarly, the automated payment transfer directories 312, 314 store data associated with scheduled automated funds transfers, such as ACH payments, that are to be migrated to new accounts.

The directories can be implemented in a variety of ways. In an example embodiment, the directories can be maintained within the file system of the migration server 200. In alternative embodiments, the directories can each be implemented as one or more tables of a database. Other possibilities exist as well, as are known in the art.

Figure 5:
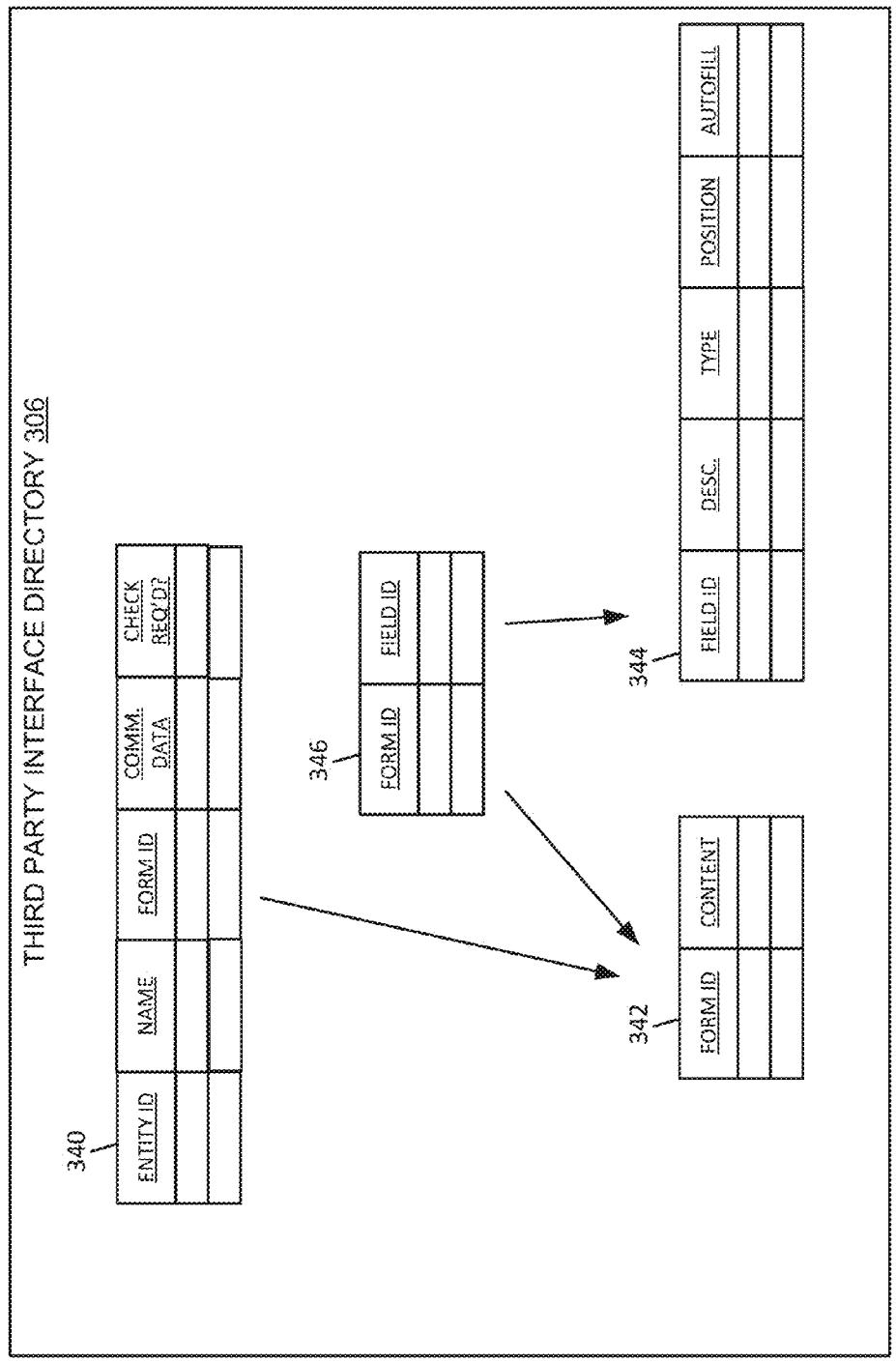
FIG. 5 illustrates an example data format of the third party interface directory data managed by the migration server, according to an example embodiment.

FIG. 5 is an example data format of the third party interface directory 306. In this example, the data of the third party interface directory 306 is contained in a plurality of data structures in the form of tables utilizing data ID fields. The data ID fields are used to map data between tables and to user interfaces. Other embodiments include other types of data structures and other methods of linking data structures.

In one example, the data format of the third party interface directory 306 includes an entity table 340, a form table 342, a field table 344, and a form-field relationship table 346. Additional tables are included in other embodiments as needed. Further, some embodiments include different table structures, such as single tables with merged data from multiple tables or multiple tables with data separated from a single table.

The entity table 340 includes a list of third-party entities and maps each entity to a unique entity ID. The unique entity ID can be used to refer to a third-party entity in other data structures. The third-party entities may be, for example, potential originators of ACH transactions or other types of transactions. In some embodiments, the entity table 340 additionally includes a name field, form ID field, a communication data field, and a check required field. The name field operates to store a textual name (or description) of the third-party entity. The form ID field operates to store a unique ID of a record in the form table 342 that can be used to provide notice of a migration to the third-party entity. The communication data field operates to store information about how to contact and communicate with the third-party entity. For example, the communication data field may store one or more of a mailing address, an e-mail address, a fax number, and a server address (and possibly associated information regarding communication protocols for the server). In some embodiments, the communication data field operates to store references (e.g., unique IDs) to records in one or more additional tables. The check required field operates to store a value (e.g., a Boolean value) indicating whether a sample check is required with the migration notice for the third-party entity. Other embodiments of the entity table 340 may include fewer, additional, or different fields.

The form table 342 includes a list of forms (or templates) and maps each form to a unique form ID. The form ID can be used to refer to a particular form record in other data structures. The forms may be specific to a particular third-party entity or may be generally applicable to multiple third-party entities. In some embodiments, the form table 342 also includes a content field. The content field operates to store the content of the form. For example, the content may be textual or graphic or a combination thereof. The content field may store the content directly or, alternatively, the content field may store the location of a file on a file system or server that contains the content. The content may be represented as an image, a portable document format (PDF) file, an extensible markup language (XML) file, or a document format file such as the Microsoft® Word document format. Other embodiments may store the content in other formats as well. Other embodiments of the form table 342 may include fewer, additional, or different fields.

The field table 344 includes a list of fields and maps each field to a unique field ID. The unique field ID can be used to refer to a particular field record in other data structures. The fields may represent data values that can be populated on various forms. In some embodiments, the field table 344 additionally includes a description field, a type field, a position field, and an autofill field. The description field operates to store a description of the field and the data that is to populate the field. The type field defines that type (e.g., text, numeric, Boolean, etc.) of data that is to populate the field. The type field may also define ranges or rules for validating the data. The position field operates to store the position of the file within a particular form. Depending on the format of the form, the position field may store a page number, X and Y coordinates, an ID, or a combination thereof. The autofill operates to store a value (e.g., a Boolean value) indicating whether the field is to be automatically filled (or populated) by the migration server when the notification is being generated. For example, fields associated with the customer's name and address may have the autofill field set, while a field associated with the customer's signature may not have the autofill field set. Additionally, some embodiments include other data associated with automatically populating fields. For example, some embodiments include store information related to locating the data to use in automatically populating the field. This information may include a function that can be called, a file that can be accessed, or a database query that can be performed to generate the data. Other embodiments of the field table 344 may include fewer, additional, or different fields.

The form-field relationship table 346 associates form records in the form table 342 with field records in the field table 344. In some embodiments, the form-field relationship table 346 includes a form ID and a field ID. Each record in the form-field relationship table 346 may associate the form corresponding to the form ID with the field corresponding to the field ID. Other embodiments use other techniques to associated fields with forms.

This example structure of the data format of the third party interface directory 306 illustrated in FIG. 5 is an example of one possible structure. Various other embodiments utilize other data structures and contain more or less tables and data fields as desired.

Figure 6:
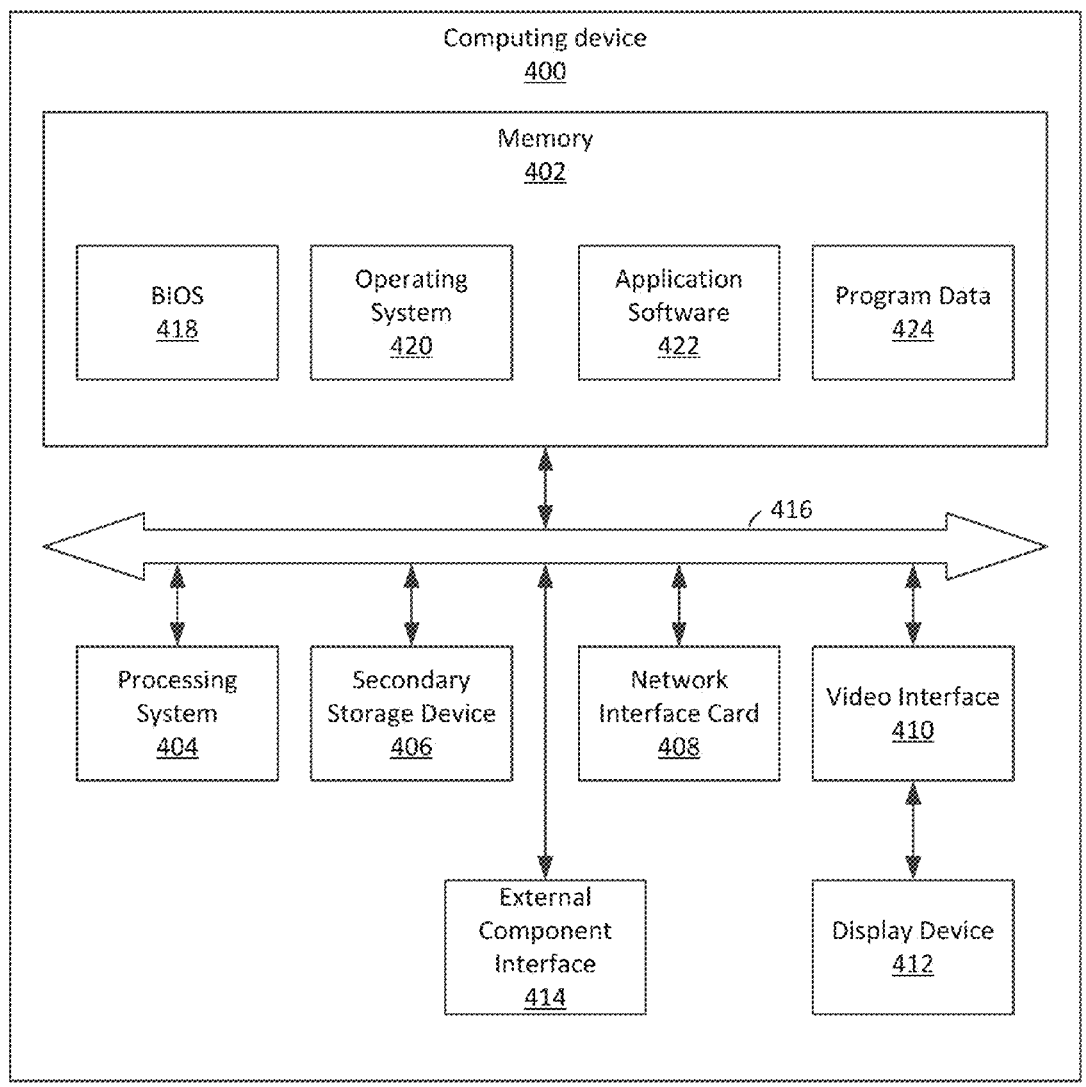
FIG. 6 is a schematic illustration of an example computing system in which aspects of the present disclosure can be implemented.

Referring now to FIG. 6, a schematic illustration of an example computing system in which aspects of the present disclosure can be implemented. The computing device 400 can represent, for example, a migration server, such as migration server 200 of FIGS. 1-3. In particular, the computing device 400 represents the physical construct of an example computing system at which an endpoint or server could be established. In particular, in various embodiments, the computing device 400 implements one particular instruction set architecture, and can be used to execute non-native software and/or translate non-native code streams in an adaptive manner, for execution in accordance with the methods and systems described herein.

In the example of FIG. 6, the computing device 400 includes a memory 402, a processing system 404, a secondary storage device 406, a network interface card 408, a video interface 410, a display unit 412, an external component interface 414, and a communication medium 416. The memory 402 includes one or more computer storage media capable of storing data and/or instructions. In different embodiments, the memory 402 is implemented in different ways. For example, the memory 402 can be implemented using various types of computer storage media.

The processing system 404 includes one or more processing units. A processing unit is a physical device or article of manufacture comprising one or more integrated circuits that selectively execute software instructions. In various embodiments, the processing system 404 is implemented in various ways. For example, the processing system 404 can be implemented as one or more physical or logical processing cores. In another example, the processing system 404 can include one or more separate microprocessors. In yet another example embodiment, the processing system 404 can include an application-specific integrated circuit (ASIC) that provides specific functionality. In yet another example, the processing system 404 provides specific functionality by using an ASIC and by executing computer-executable instructions.

The secondary storage device 406 includes one or more computer storage media. The secondary storage device 406 stores data and software instructions not directly accessible by the processing system 404. In other words, the processing system 404 performs an I/O operation to retrieve data and/or software instructions from the secondary storage device 406. In various embodiments, the secondary storage device 406 includes various types of computer storage media. For example, the secondary storage device 406 can include one or more magnetic disks, magnetic tape drives, optical discs, solid state memory devices, and/or other types of computer storage media.

The network interface card 408 enables the computing device 400 to send data to and receive data from a communication network. In different embodiments, the network interface card 408 is implemented in different ways. For example, the network interface card 408 can be implemented as an Ethernet interface, a token-ring network interface, a fiber optic network interface, a wireless network interface (e.g., WiFi, WiMax, etc.), or another type of network interface.

The video interface 410 enables the computing device 400 to output video information to the display unit 412. The display unit 412 can be various types of devices for displaying video information, such as an LCD display panel, a plasma screen display panel, a touch-sensitive display panel, an LED screen, a cathode-ray tube display, or a projector. The video interface 410 can communicate with the display unit 412 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 414 enables the computing device 400 to communicate with external devices. For example, the external component interface 414 can be a USB interface, a FireWire interface, a serial port interface, a parallel port interface, a PS/2 interface, and/or another type of interface that enables the computing device 400 to communicate with external devices. In various embodiments, the external component interface 414 enables the computing device 400 to communicate with various external components, such as external storage devices, input devices, speakers, modems, media player docks, other computing devices, scanners, digital cameras, and fingerprint readers.

The communication medium 416 facilitates communication among the hardware components of the computing device 400. In the example of FIG. 6, the communications medium 416 facilitates communication among the memory 402, the processing system 404, the secondary storage device 406, the network interface card 408, the video interface 410, and the external component interface 414. The communications medium 416 can be implemented in various ways. For example, the communications medium 416 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 6, the memory 402 stores a Basic Input/Output System (BIOS) 418 and an operating system 420. The BIOS 418 includes a set of computer-executable instructions that, when executed by the processing system 404, cause the computing device 400 to boot up. The operating system 420 includes a set of computer-executable instructions that, when executed by the processing system 404, cause the computing device 400 to provide an operating system that coordinates the activities and sharing of resources of the computing device 400. Furthermore, the memory 402 stores application software 422. The application software 422 includes computer-executable instructions, that when executed by the processing system 404, cause the computing device 400 to provide one or more applications. The memory 402 also stores program data 424. The program data 424 is data used by programs that execute on the computing device 400.

Although particular features are discussed herein as included within an electronic computing device 400, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7:
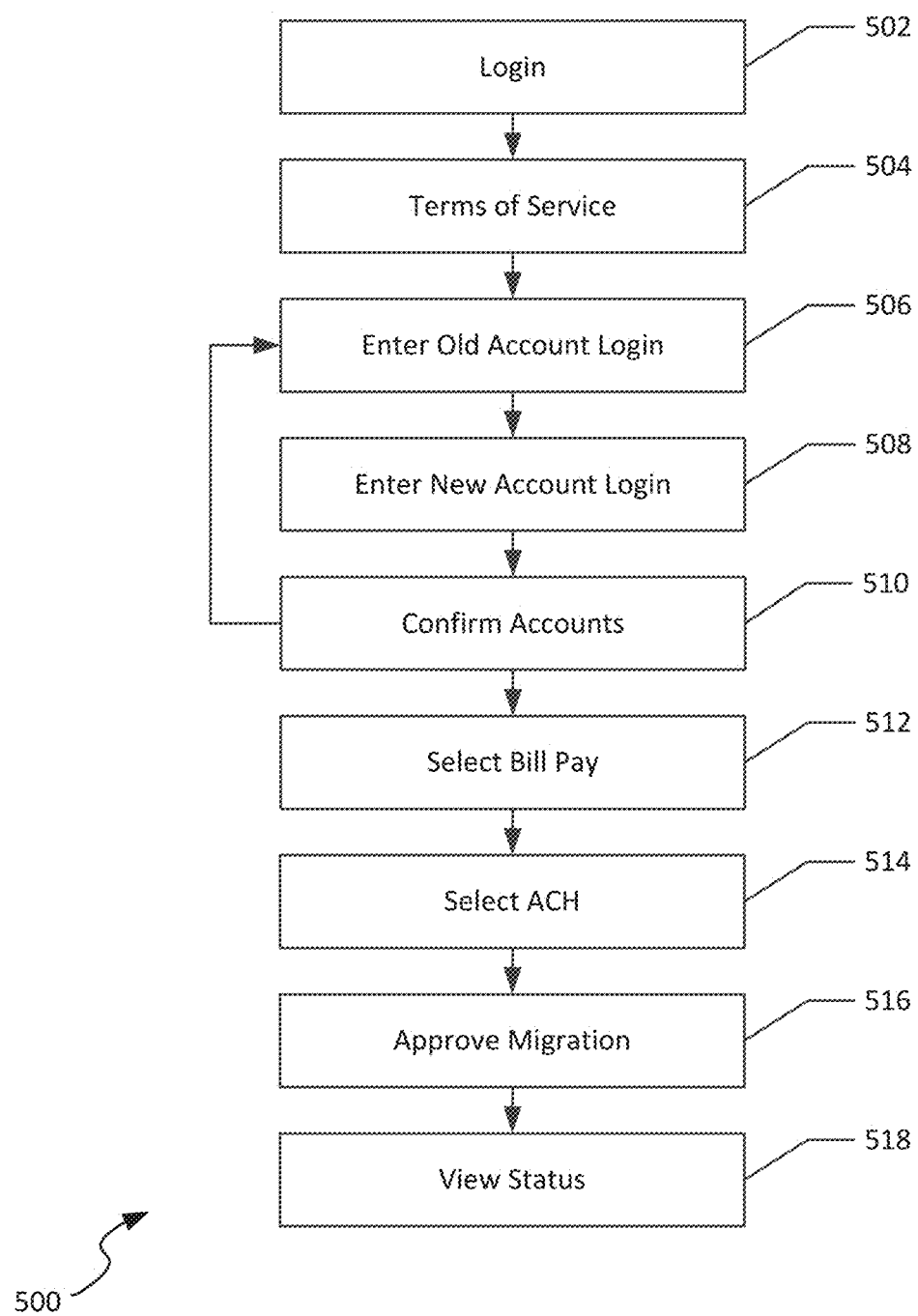
FIG. 7 is a flowchart of a method by which a user can interact with a conversion server to initiate an automated financial account settings migration, according to an example embodiment.
Figure 8A:
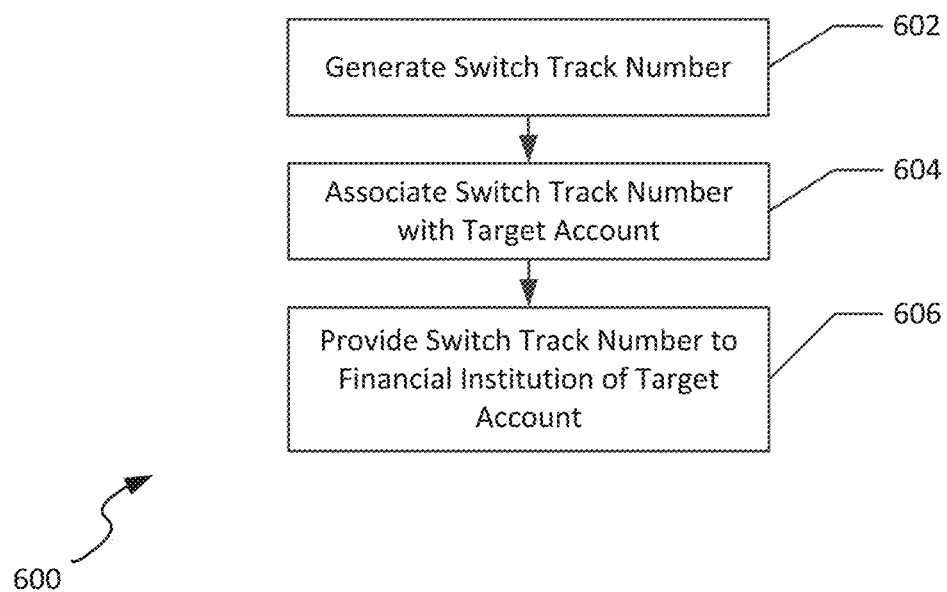
FIG. 8A is a flowchart of a method of activating an automated financial account settings migration based on a request from a financial institution, according to an example embodiment.
Figure 8B:
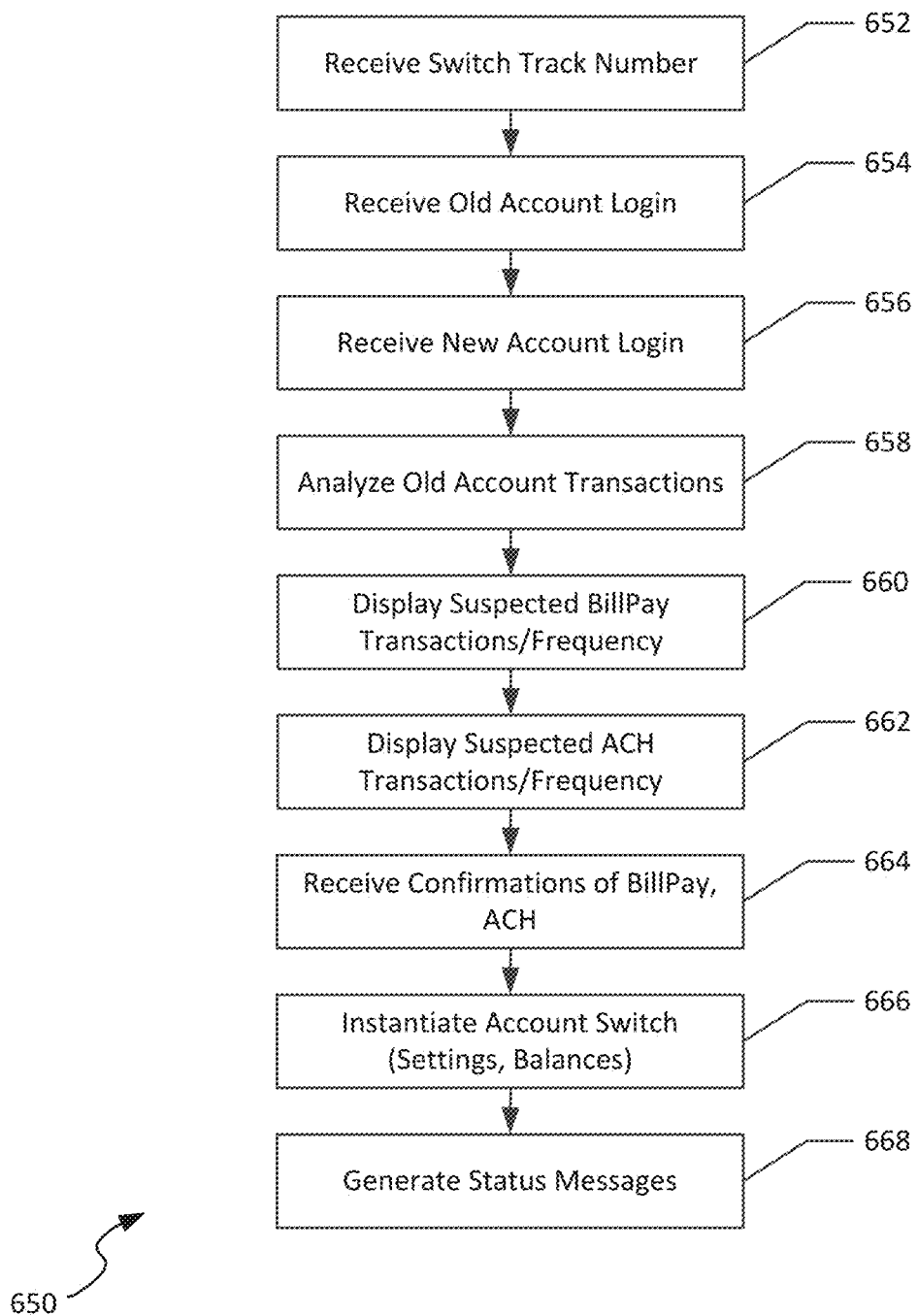
FIG. 8B is a flowchart of a method of converting automated financial account settings at a conversion server, according to an example embodiment.
Figure 9:
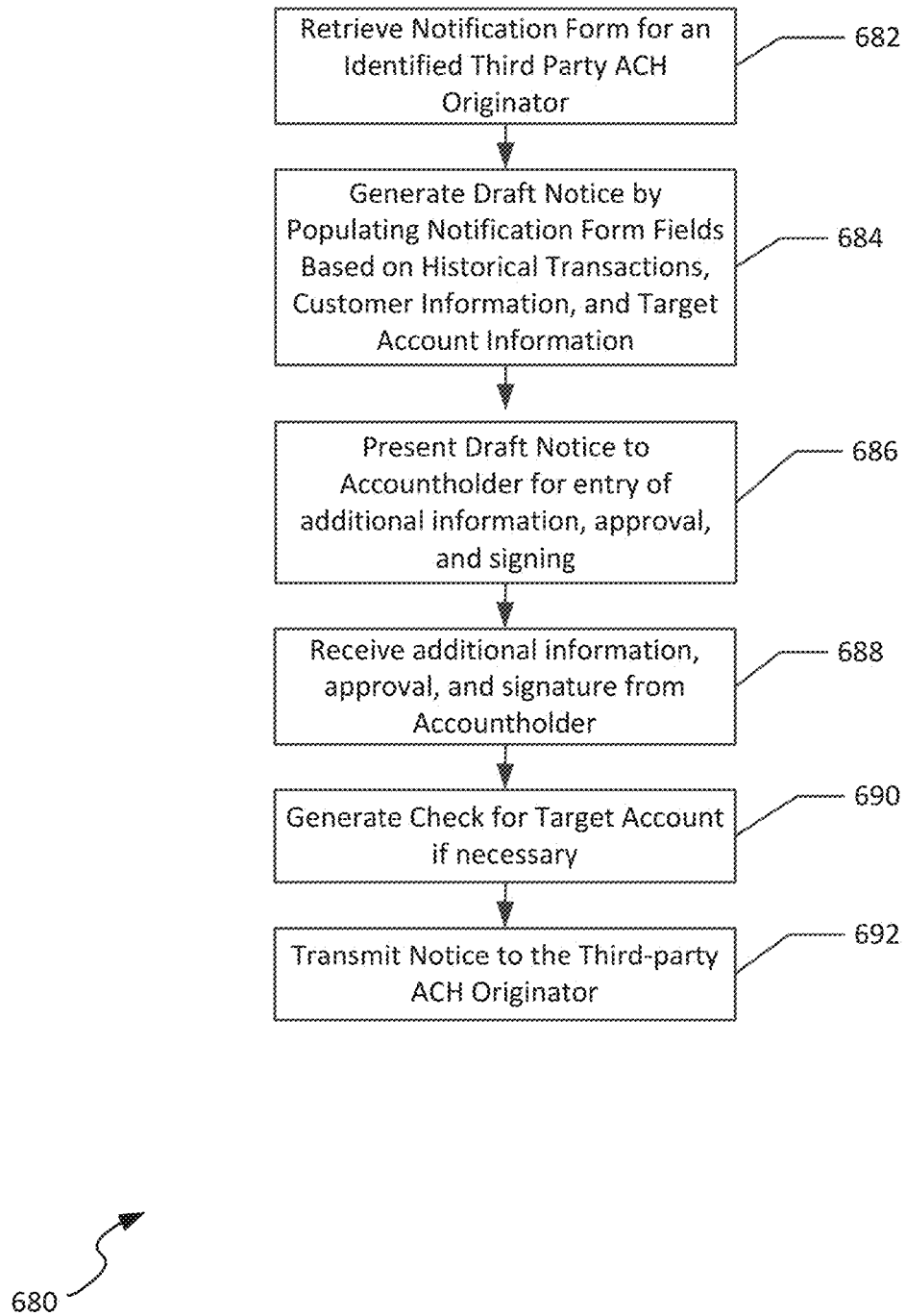
FIG. 9 is a flowchart of a method of providing notice to a third-party entity to migrate externally initiated transactions, according to an example embodiment.

Referring to FIGS. 7, 8A-8B, and 9, various methods by which the automated migration of account settings are described. FIG. 7 generally describes a method 500 performed by a customer of a financial institution who wishes to migrate account settings to a target account. FIGS. 8A-8B illustrate methods 600, 650, respectively, performed by the migration server to accomplish the account settings migration process. FIG. 9 illustrates a method 680, performed by the migration server, to generate and transmit migration notices to third-parties.

Referring now to FIG. 7, method 500 by which a user can interact with a conversion server to initiate an automated financial account settings migration includes a login operation 502. The login operation 502 includes, in some embodiments, providing a switch tracking number received by the user from a financial institution that holds a target financial account to which settings are to be migrated. The login operation 502 can be accomplished, for example, via a browser window and accessing a user interface generated by the migration server, such as user interface 700 of FIG. 10.

A terms of service operation 504 corresponds to accepting terms of service applied by the migration server; such terms of service can be any of a variety of conventional terms of service or notice provisions relating to migration of funds or migration of settings between accounts. An example of a browser-based user interface with which the terms of service operation 504 can be performed is discussed below in connection with user interface 800 of FIG. 11.

An old accounts login operation 506 includes providing, via a further user interface, an identity of one or more source financial accounts from which settings and/or funds are to be transferred. This can include, for example, providing a name of the financial institution at which the existing account resides, as well as access credentials, such as a username and password, of a customer associated with the account. An example of a browser-based user interface with which the old accounts login operation 506 can be performed is discussed below in connection with user interface 900 of FIG. 12.

A new account login operation 508 includes providing, via a still further user interface, access credentials to a target account to which user settings, such a funds transfer settings (e.g., bill pay, direct deposit, ACH, etc.) can be migrated. An example of a browser-based user interface with which the new account login operation 508 can be performed is discussed below in connection with user interface 1000 of FIG. 13.

An account confirmation operation 510 presents to the user a summary of the accounts to be accessed for the account migration process. Optionally, the user can opt to add additional old accounts, selecting a button indicating a desire to return to the old accounts login operation 506 to add additional accounts to be migrated. Or, the user can confirm the accounts to be migrated and opt to proceed to select specific settings and/or features of those accounts to be migrated. An example of a browser-based user interface with which the account confirmation operation 510 can be performed is discussed below in connection with user interface 1100 of FIG. 14.

Following the account confirmation operation 510, the migration server will access the accounts identified by the user, and will access both settings associated with those preexisting accounts, as well as transaction history information associated with the accounts. The migration server will, based on parsing of the transaction history (to the extent available, and preferably for at least the past year of account transactions), determine whether one or more funds transfers have occurred in any of those accounts, and whether such funds transfers correspond to recurring events that should potentially be transferred to the target account.

A bill pay selection operation 512 corresponds to selection of one or more detected bill pay operations that the user wishes to transfer to the target account associated with the migration operation. In example embodiments, the user is presented with a plurality of different bill pay operations that are detected by the migration server. The bill pay selection operation 512 includes a user selecting at least one of the identified bill pay transactions that were detected based on the user's old (i.e., preexisting) account information.

Similarly, an ACH selection operation 514 corresponds to selection of one or more detected ACH operations that the user wishes to transfer to the target account. As with the bill pay operation, the user is presented with a selectable list of operations that are detected by the migration server. Example user interfaces associated with the bill pay selection operation 512 and ACH selection operation 514 are described below in connection with FIGS. 17-18.

Although in the context of the present disclosure a bill pay and ACH type operations are discussed, it is recognized that these types of payments are exemplary, rather than limiting. In particular, the bill pay transactions can represent any of a variety of transactions associated with funds transfers originating at the institution holding the existing account, while ACH operations represent types of operations that are initiated remote from the institution (e.g., ACH payments, direct deposits, etc.).

An approval operation 516 corresponds to review and approval of the selected list of funds transfer operations that are to be migrated to the target account. The approval operation 516 can include providing an electronic signature to authorize the switch of bill pay and ACH transactions. An example of a user interface useable to perform the approval operation 516 is described below in connection with FIG. 19.

Following the approval operation 516, the migration server will initiate a migration process. This will include migration to the target account any selected bill pay or ACH transactions. For bill pay transactions, this can include the migration server copying the bill pay transaction to the target account, validating the bill pay transaction, and removing the bill pay transaction from the account from which it was migrated. For ACH transactions, this can include notifying an ACH-originating entity (typically a third party unaffiliated with the financial institutions) and verifying that confirmation of a changed ACH transaction is received. Optionally, the migration server can also transfer funds from existing accounts to the new (target) account. In such embodiments, it may be suggested to the user that at least some of the funds in the existing account not be transferred until the customer is sure that the ACH transaction has successfully been transferred to the target account.

A status operation 518 allows a user to access a migration operation by way of either notifications or through use of a switch track number. To use a switch track number, a user can enter such a number into the user interface of FIG. 10, discussed below. To register for notifications, a user interface can receive contact information, such as an email address or cell phone number. When changes have completed successfully, a link can be sent to the user to view a status of the migration. An example user interface for registering for such notifications is discussed in further detail below in connection with FIG. 24, and an example user interface for reviewing an account status for a particular migration is discussed in connection with FIG. 25.

Referring now to FIGS. 8A-8B, flowcharts of methods performed by a migration server, such as server 200, are disclosed, and which describe in further detail operations performed by the migration server to accomplish an automated migration of financial account settings.

FIG. 8A is a flowchart of a method 600 of activating an automated financial account settings migration based on a request from a financial institution, according to an example embodiment. The method 600 is instantiated when the migration system receives a request from the financial institution to institute a migration. The financial institution from which the request is received is stored in a database, such as in schema 300, and the migration server performs a generation operation 602, which generates a new switch track number. The switch track number is associated with the financial institution at an association operation 604, and provided to the financial institution associated with a target account at a transmission operation 606. The financial institution can then provide the switch track number to a customer, or can use the switch track number to assist the customer in migrating automated funds transfers to the account associated with that financial institution. The switch track number can take any of a variety of forms, such as any combination of alphanumerical characters useable to uniquely identify the migration process to a particular target account of the financial institution associated with that target account.

FIG. 8B is a flowchart of a method 650 of converting automated financial account settings at a conversion server, according to an example embodiment. The method 650 is generally performed by the migration server in response to access by a customer, which may be the customer receiving the switch track number as noted in FIG. 8A.

Figure 10:
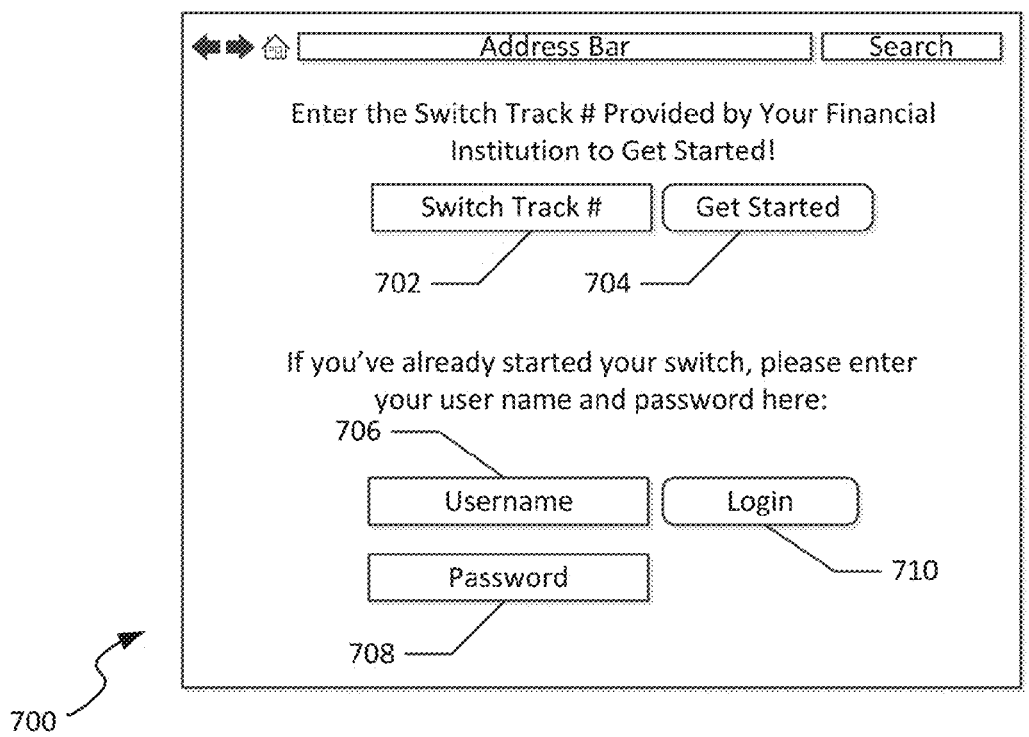
FIG. 10 is a schematic user interface of an initial welcome page presented to a user by a conversion server for initiating an automated financial account settings migration, according to an example embodiment.

In the embodiment shown, the method 650 includes a switch track number receipt operation 652, which receives a switch track number from a user in a user interface presented to the user, such as user interface 700 of FIG. 10. The method further includes an old account operation 654, which includes receiving old account identity and login information in a user interface, such as interface 900 of FIG. 12. The method also includes a new account operation 656, which includes receiving new account login information in a user interface, such as interface 1000 of FIG. 13. It is noted that the user can opt to enter additional old account information, for example by returning to user interface 900 to enter additional old account login information. As such, multiple existing accounts can be migrated into a single "new", or target, account.

Upon receiving user authorization (as discussed above in connection with FIG. 7), an analysis operation 658 accesses the old accounts (i.e., preexisting accounts) to determine the existence of any funds transfer operations that may be desirable to migrate to a new target account. This can include reviewing scheduled payments associated with the accounts themselves, as well as ACH or other third party initiated payments that are reflected in the transaction history of each account. In preferred embodiments, transaction histories are reviewed across a long amount of time to ensure that even intermittent or infrequent funds transfers are captured. For example, it may be, in some embodiments, preferable to review at least a year of transaction data from preexisting accounts, to the extent such information is available via the online access provided by the financial institutions associated with those existing accounts. In other embodiments, as much transaction data as is available from the preexisting financial institution can be used.

Figure 17:
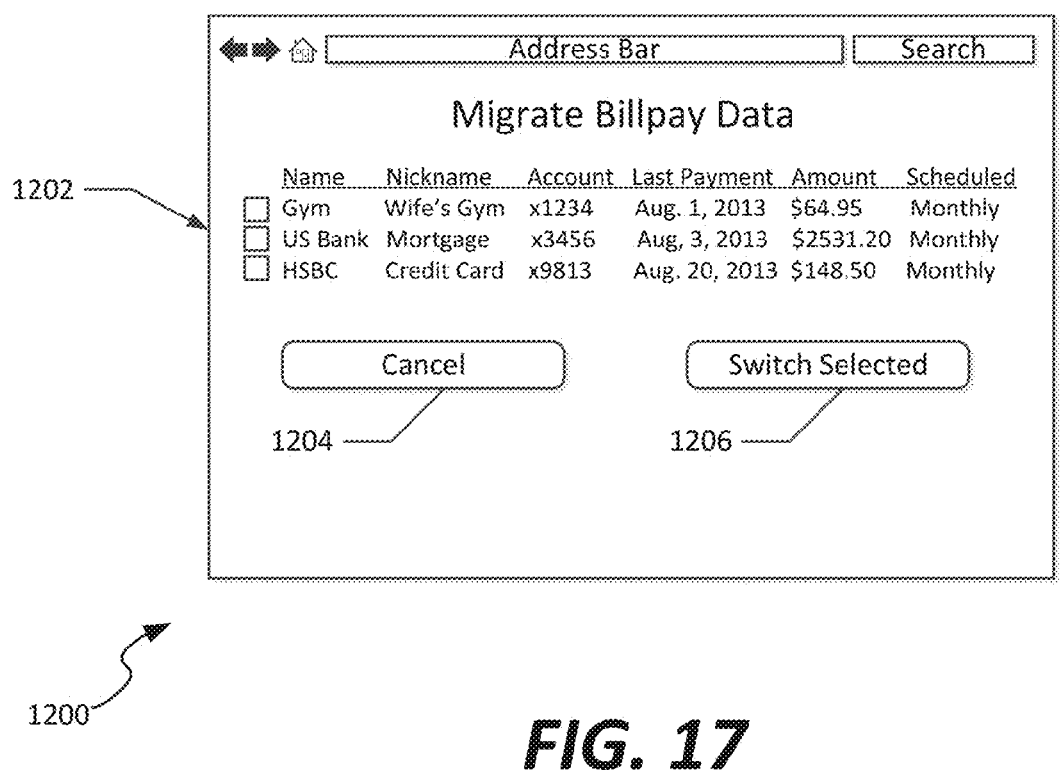
FIG. 17 is a schematic user interface of a billpay confirmation page presented to a user by a conversion server for initiating an automated financial account settings migration, according to an example embodiment.
Figure 18:
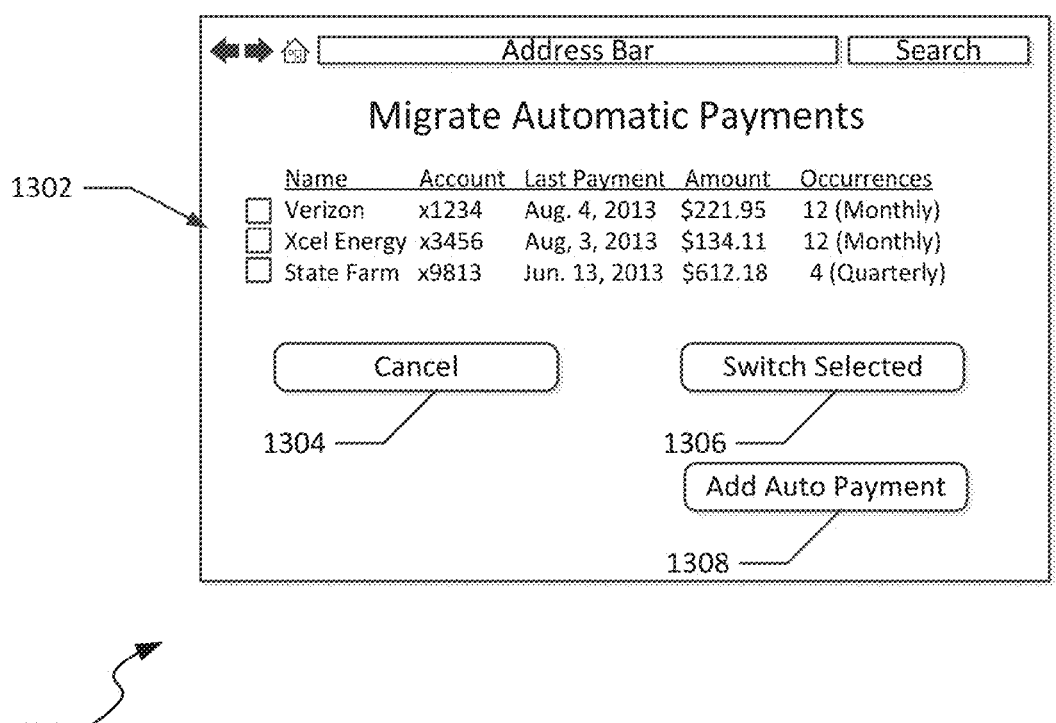
FIG. 18 is a schematic user interface of an ACH confirmation page presented to a user by a conversion server for initiating an automated financial account settings migration, according to an example embodiment.

A billpay display operation 660 displays each of the billpay operations that are detected in the account settings or transaction history, allowing the user to view and select one or more of the billpays to be migrated to the target account. Similarly, an ACH display operation 662 displays each of the ACH operations that have been executed on each of the existing accounts, allowing the user to view and select the desired ACH transactions to migrate to the target account. Example user interfaces providing for such functionality are illustrated in FIGS. 17-18, described below.

Figure 19:
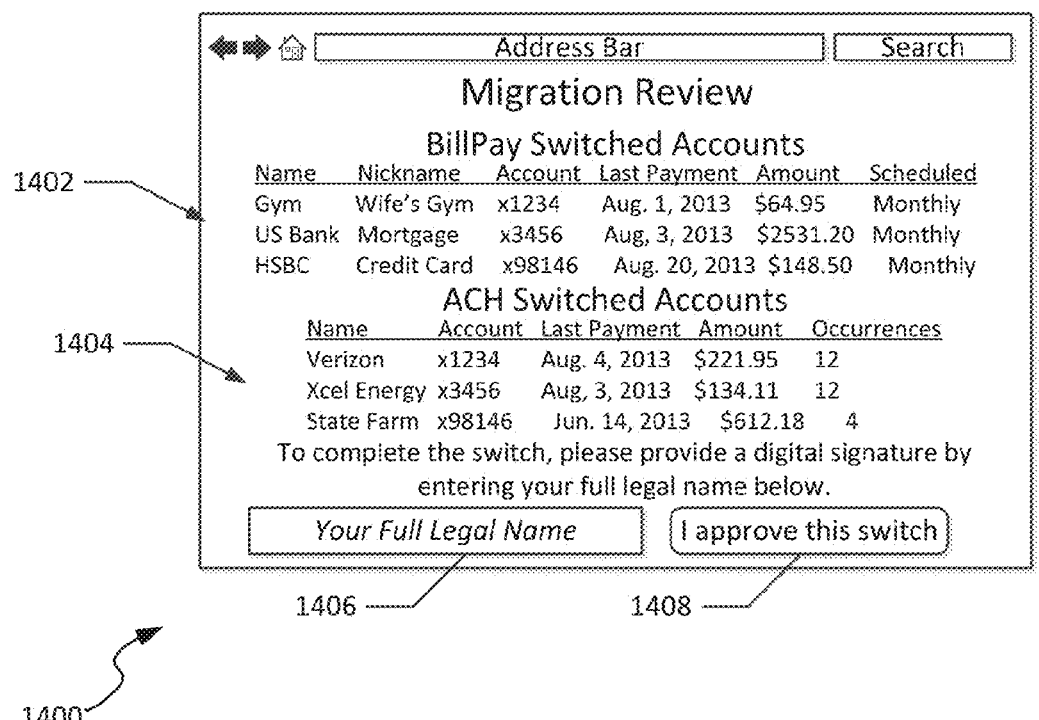
FIG. 19 is a schematic user interface of a migration review page presented to a user by a conversion server for initiating an automated financial account settings migration, according to an example embodiment.

A confirmation operation 664 requests and receives confirmation from the user that the selected transactions and settings are to be migrated to the new account, receiving an electronic signature from the user. An example user interface providing for such confirmation is illustrated in FIG. 19.

An account switch operation 666 executes upon receiving the confirmation from the user, and transfers any selected account settings, automated funds transfers, and optionally any desired funds from one or more existing accounts to the target account associated with the switch tracking number. In the example of billpays, a transfer can be performed quickly, and little delay in either the billpay migration or funds transfer may be required. However, for the example ACH or other third party transactions that may occur, the migration server may be configured to maintain those migrations in a pending state until receiving confirmation that the ACH was successfully migrated by either the ACH request issuer (e.g., a third party 110) or from the financial institution associated with the target account, indicating that the target account received an ACH request based on the migration request. In particular the migration server will provide to each ACH request issuer updated account information, such that the bank routing and account number for the target account. For example, the migration server may access the third party interface directory 306 to retrieve information about how to connect to third parties. Additionally, the migration During the pendency of any account migration, it is noted that it may be possible for a funds transfer request to be received by a preexisting institution, rather than the target institution. For this reason, in cases where funds are to be transferred alongside settings, the migration server will act to hold at least some funds in the existing accounts until receiving confirmation that the delayed migration of funds transfer operations has occurred. The amount of holdback of such funds may vary, in different implementations. In some example embodiments, a maximum amount for the automated withdrawals over the past 6 months to a year is used, to ensure that adequate funds are maintained in the existing account in case an ACH or other funds transfer request that is received by the institution associated with the existing account can be fulfilled. In other embodiments, the funds transfer is initiated by the user, and the system described herein provides a recommendation as to funds transfers to be performed that would maximize the amount of funds transferred to a target account. In such embodiments, the system can be configured to advise the user/customer of an amount of funds to retain in an existing account to ensure that any ACH transaction or other lingering transactions that are not immediately migrated to the target account.

Figure 24:
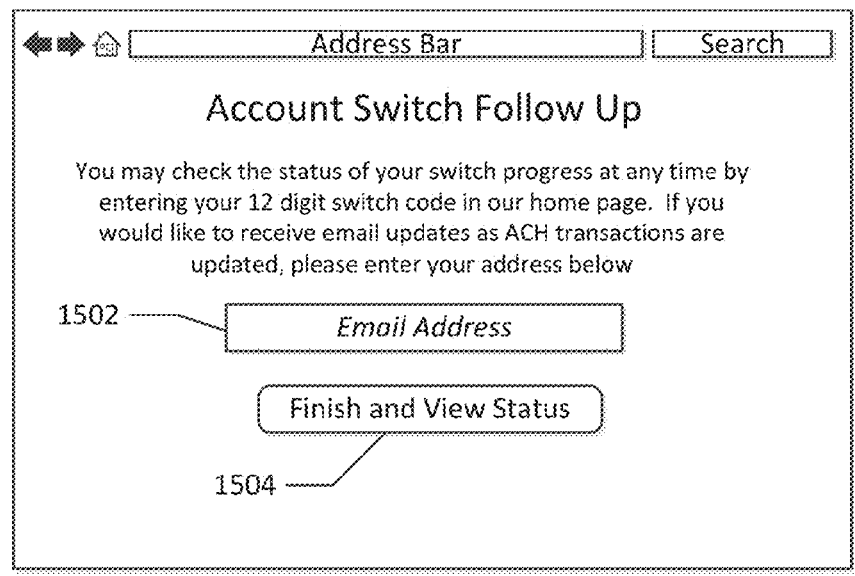
FIG. 24 is a schematic user interface of a status notification page presented to a user by a conversion server for initiating an automated financial account settings migration, according to an example embodiment.
Figure 25:
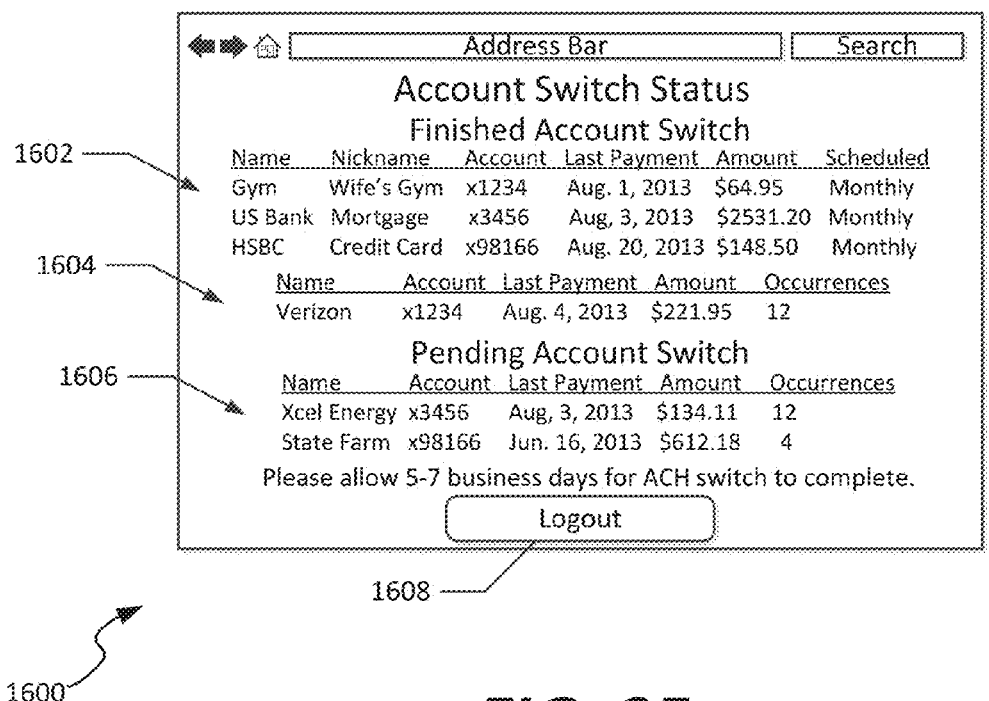
FIG. 25 is a schematic user interface of a migration status page presented to a user by a conversion server for initiating an automated financial account settings migration, according to an example embodiment.

A status operation 668 allows a user to review a status of a migration process, by displaying or notifying a user of the status of migration of various account settings and automated funds transfers. For example, the status operation can display completed migration of some accounts or pending migration status of others, as illustrated in FIG. 25, below. Additionally, a user can opt to receive notifications, for example at an email address provided to the migration server using a user interface such as user interface 1500 of FIG. 24.

Referring to FIGS. 10-26, various user interfaces presented to a customer (user) who wishes to initiate a migration of automated funds transfer operations are illustrated which depict functionality of the migration server 200, above. In general, the user interfaces described below are intended as exemplary, rather than required; as such, it is understood that various functionality in addition to that described could be incorporated into such user interfaces to enhance the features of the migration server.

Referring now to FIG. 9, a method 680 by which a notice can be provided to a third-party entity may be used by the method 650 (illustrated and described in detail with respect to FIG. 8B) to migrate ACH or direct deposit transactions. Method 680 can be used to provide notice of a migration to a particular third-party entity, such as a third-party entity identified in operation 662 and confirmed in operation 664 of the method 650.

At operation 682, a notification form (template) is retrieved for the identified third-party entity. The notification form may be retrieved from the third party interface directory 306 (e.g., for example from form table 342). The particular form in the form table 342 may be identified by querying the entity table 340 to find the form ID associated with an entity record that matches the identified third-party entity (e.g., using the name or the entity ID). If the identified third-party entity does not have a record in the entity table 340 or is not associated with a form record in the form table 342, a generic form may be retrieved.

At operation 684, a draft notice is generated for the third-party entity. The draft notice may generated by populating the fields (e.g., the field records in the field table 344) associated with the form. Depending on the data required, the fields may be populated in various manners. For example, some of the fields may be populated using biographical or other information about the customer. This biographical or other information may have been input to the migration server 200 by the customer using a user interface. Alternatively, this information about the customer may be retrieved from one or more of the existing financial accounts. The data used to populate other fields may be retrieved by processing the transaction history data. For example, in some embodiments, the account number issued by the third-party may be included in the transaction history and can be extracted for use in populating a form. Additionally, other fields may populated with information about the new (or target) financial account, such as the name of the financial institution, the routing number, and the account number. In some embodiments, the fields may be populated by requesting data from the third-party entity (such as by accessing a server provided by third party or a related entity). Finally, some fields may not be populated in the draft notice. Other embodiments are possible as well that use additional or different techniques to populate the form fields or generate the draft notice.

At operations 686, the draft notice is presented to the customer (or accountholder). In some embodiments, the draft notice is presented in a user interface, such as the example user interface 1420 shown in FIG. 20. Additionally, the customer may be prompted to provide additional information during this operation. For example, if a field on the form is not configured to be automatically populated or could not be automatically populated, the user may be prompted to provide the information to fill in the data. Examples of this data may include information provided on a statement or invoice from the third party. After the fields of the draft notice have been populated, the customer may be prompted to approve and sign the draft notice. In some embodiments, the customer may provide an eSignature. The eSignature may include textual or graphical content to indicate the customer approves the notice. Then at operation 688, the migration server 200 receives the additional information, approval, and signature from the customer. In some embodiments, the customer will approve and enter a signature for multiple notices at the same time.

At operation 690, an example check (such as a voided check) is generated for inclusion with the notice as well. In some embodiments, the migration server 200 retrieves an appropriate check number from the target financial institution. Additionally, the migration server 200 may notify the target financial institution of the voided check number. In some embodiments, operation 690 is not performed, such as when the third party entity does not require an example check.

At operation 692, the notice is transmitted to the third-party entity. The notice may be transmitted using a variety of techniques, including, but not limited to transmission by postal mail, e-mail, facsimile, or electronic data transfer. In at least some embodiments, transmission of the notice to third party is performed using the data in the communication data field of the entity table 340 (illustrated and described with respect to FIG. 5).

FIG. 10 illustrates a user interface 700 of an initial welcome page presented to a user by a conversion server for initiating an automated financial account settings migration, according to an example embodiment. The user interface 700 includes a welcome message as well as a user entry region 702 for receiving a switch track number from a customer who wishes to initiate an account migration. A confirmation button 704 allows the user to confirm that the switch track number has been entered. In some embodiments, the user interface 700 also includes a user entry regions 706 and 708 for receiving a username and password, respectively, from a user who has already established an account with the conversion server. A login button 710 allows the user to confirm that the username and password have been entered.

Figure 11:
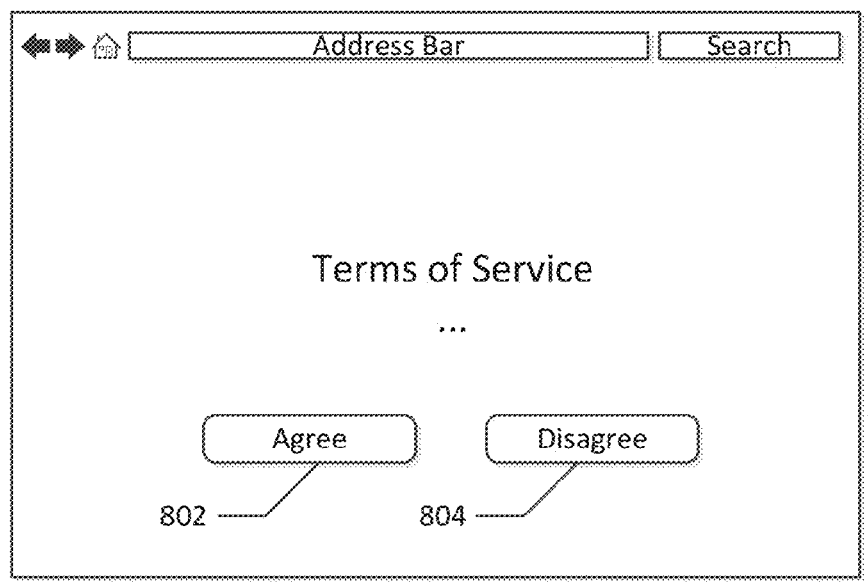
FIG. 11 is a schematic user interface of a terms of service page presented to a user by a conversion server for initiating an automated financial account settings transfer, according to an example embodiment.

FIG. 11 illustrates a user interface 800 of a terms of service page presented to a user by a conversion server for initiating an automated financial account settings transfer. The user interface 800 can be presented after a user selects the confirmation button 704, and displays terms of service for use of the migration server to migrate automated payments between accounts. An acceptance button 802 allows the customer to proceed with the account migration, and a disagree button 804 confirms that the customer has changed his/her mind, and does not allow the customer to proceed with the automated account migration. Of course, the customer could opt to manually transfer such data, but in that case the customer lacks the convenience provided by the migration server, and risks missing one or more of the automated funds transfer operations (e.g., bill pay or ACH) when transferring settings to a new account.

Figure 12:
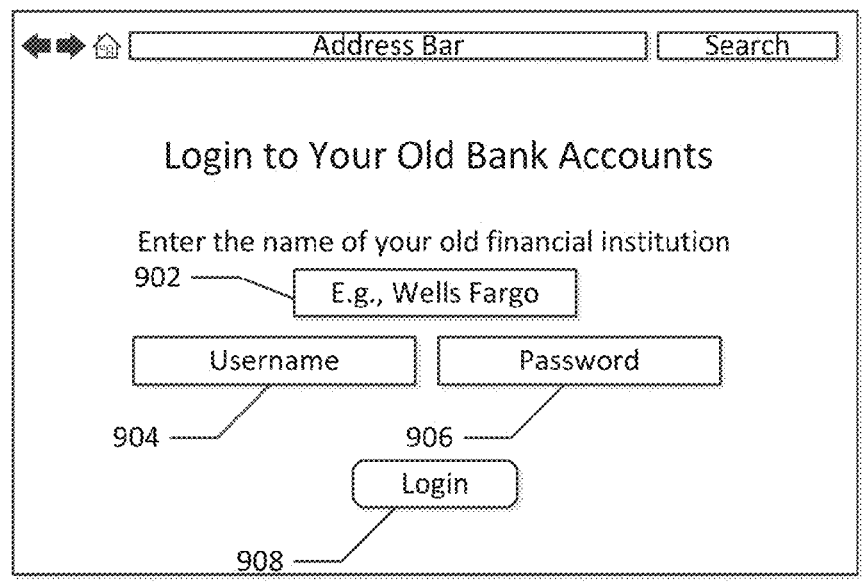
FIG. 12 is a schematic user interface of an old accounts login page presented to a user by a conversion server for initiating an automated financial account settings migration, according to an example embodiment.

After acceptance of the terms of service, FIG. 12 illustrates a user interface 900 of an old accounts login page presented to a user by a conversion server for initiating an automated financial account settings migration. The user interface 900 receives a name of an existing institution holding an account for the customer in a data entry field 902, as well as login credentials in a username field 904 and password field 906. A login button 908 causes the migration server to contact the identified financial institution to confirm that the login credentials and name of the institution are correct.

Figure 13:
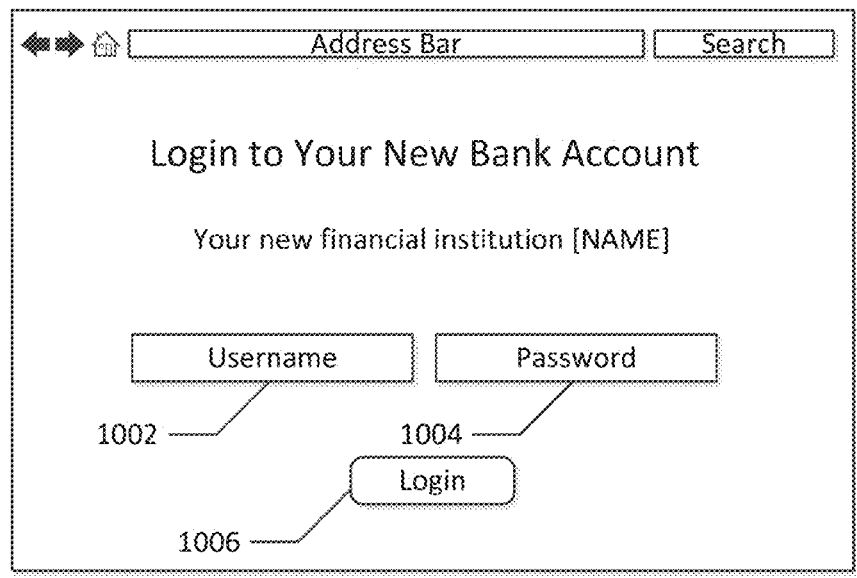
FIG. 13 is a schematic user interface of a new account login page presented to a user by a conversion server for initiating an automated financial account settings migration, according to an example embodiment.

After receipt of FIG. 13 illustrates a user interface 1000 of a new account login page presented to a user by a conversion server for initiating an automated financial account settings migration. The user interface 1000 includes a message confirming the identity of the financial institution that holds the target account to which settings are to be migrated, and includes a username field 1002 and password field 1004 for receiving login information associated with that customer's target account. A login button 1006 causes the migration server to contact the financial institution associated with the target account to confirm that the migration server can communicate with the financial institution and access that target account.

Figure 14:
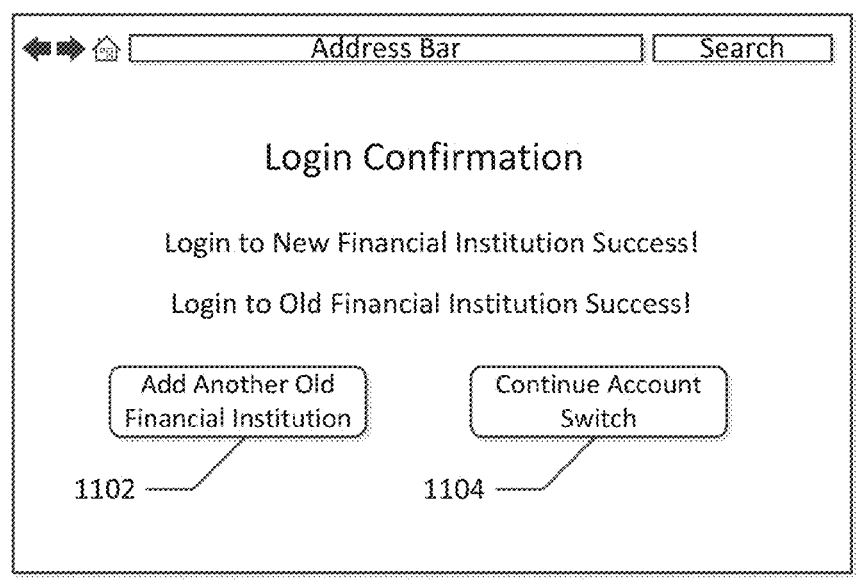
FIG. 14 is a schematic user interface of a login confirmation page presented to a user by a conversion server for initiating an automated financial account settings migration, according to an example embodiment.

FIG. 14 illustrates a user interface 1100 of a login confirmation page presented to a user by a conversion server for initiating an automated financial account settings migration. The user interface 1100 confirms that the entered information in user interfaces 900, 1000 was received and that the migration server can successfully communicate with financial institutions and access both the existing accounts from which migration is desired, as well as a target account to which account information, including automated funds transfers, will be migrated. The user interface 1100 includes a return button 1102 allowing a customer to enter additional existing financial institutions and accounts to be migrated into a target account. The user interface also includes a confirmation button 1104 allowing the customer to proceed with migration of the accounts listed in the user interface 1100.

Figure 15:
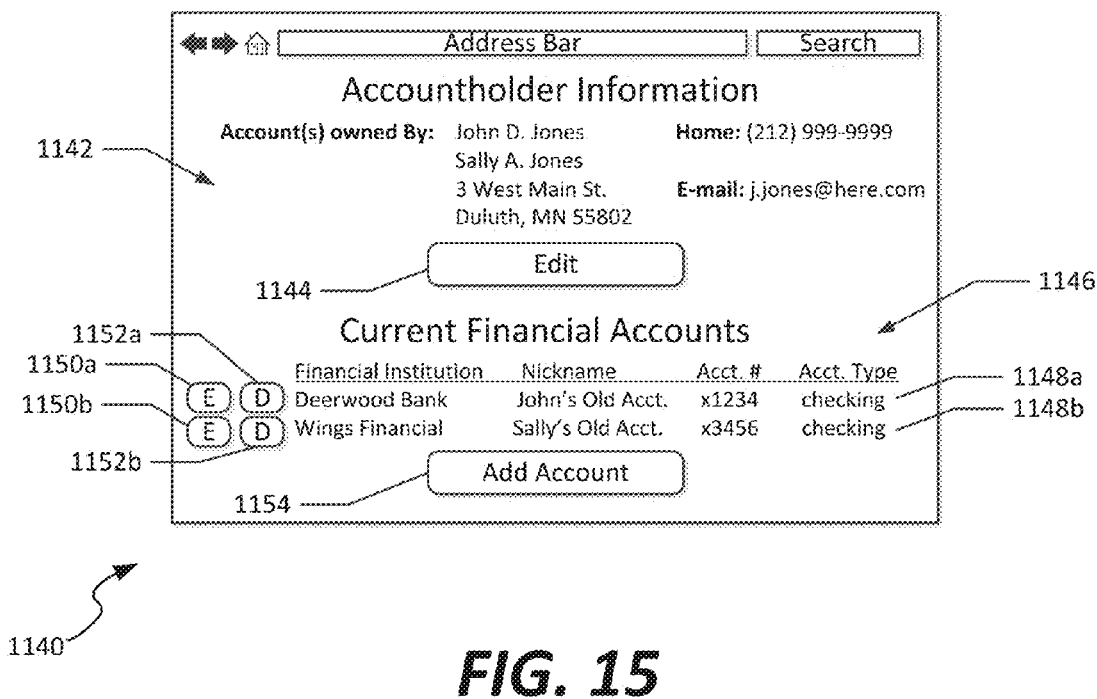
FIG. 15 is a schematic user interface of an account information page presented to a user by a conversion server for initiating an automated financial account settings migration, according to an example embodiment.

FIG. 15 illustrates a user interface 1140 of an account information page presented to a user by a conversion server for initiating an automated financial account settings migration. The user interface 1140 displays information about the customer (or accountholder) and the existing accounts associated with the customer. The user interface 1140 includes a listing 1142 of information about the customer. This information may include the name or names of the people associated with the existing accounts, an address, a phone number, and an e-mail address. Other embodiments include additional or different information as well. The user interface 1140 includes an edit button 1144 to edit the customer information. The user interface 1140 also includes a listing 1146 of existing financial accounts. In this example, a first existing financial account 1148a and a second existing financial account 1148b are shown. The user interface 1140 includes edit buttons 1150a and 1150b to edit the information associated with the existing financial accounts 1148a and 1148b respectively. The user interface 1140 also includes delete buttons 1152a and 1152b to delete the existing financial accounts 1148a and 1148b respectively. The user interface 1140 includes an add account button 1154 to add another existing account. In some embodiments, the edit buttons 1150a and 1150b and the add account button 1154 trigger display of a pop-up user interface as described in FIG. 16.

Figure 16:
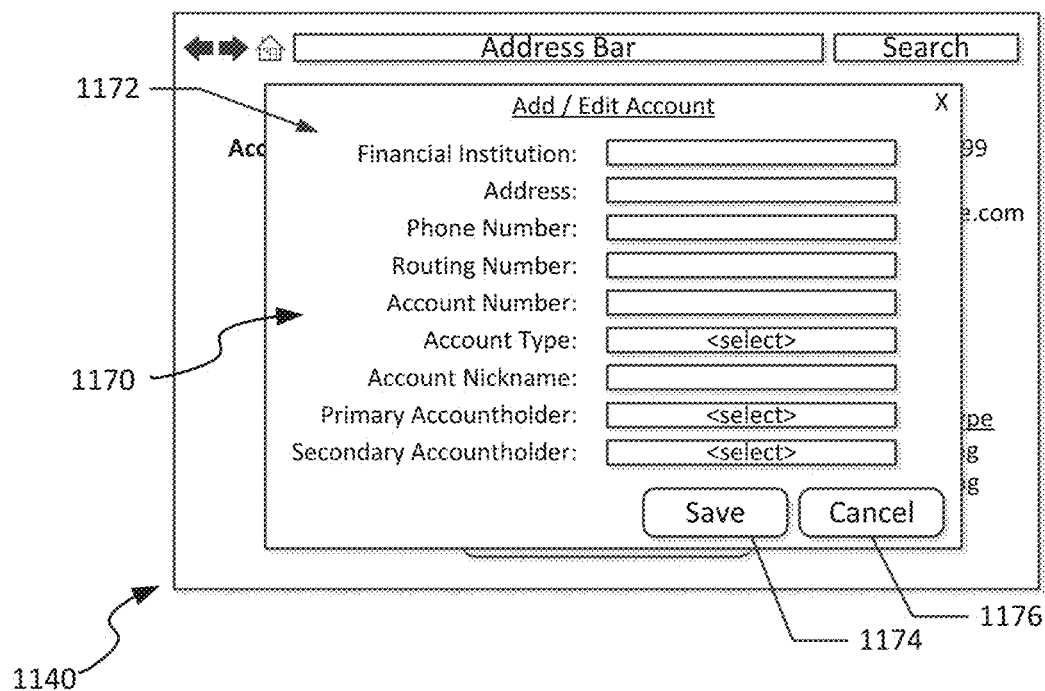
FIG. 16 is a schematic user interface of an add/edit account page presented to a user by a conversion server for initiating an automated financial account settings migration, according to an example embodiment.

FIG. 16 illustrates a user interface 1170 of an add/edit account page presented to a user by a conversion server for initiating an automated financial account settings migration. In some embodiments, the user interface 1170 pops-up over the user interface 1140 (illustrated and described with respect to FIG. 15) to add or edit an existing financial account. The user interface 1170 includes a listing 1172 of fields for receiving or editing information associated with the existing financial account. Example fields include the name, address, and phone number of the financial institution, a routing number associated with the financial institution, an account number and type, a nickname for the account and the identity of the primary and secondary accountholder. In various embodiments, the fields may be text entry fields, drop-down selection fields, or other types of fields. The user interface 1170 also includes a save button 1174 to save the entered or edited account information. Additionally, the user interface 1170 includes a cancel button 1176 to cancel adding or editing the account information.

FIG. 17 illustrates a user interface 1200 of a billpay confirmation page presented to a user by a conversion server for initiating an automated financial account settings migration. The user interface 1200 includes a listing 1202 including detected bill pay events in the selected existing accounts that are analyzed by the migration server (in conjunction with analysis operation 658 of FIG. 8B). The listing 1202 includes various details of each detected billpay operation, including a name, nickname, account number, last payment, payment amount and payment frequency of the automated billpay. A selection button is associated with each billpay listing to allow the user to select one or more of the billpays to be migrated. A cancel button 1204 cancels billpay migration, while a switch button 1206 registers the selected billpay listings to be migrated, and allows the migration server to proceed to ACH migration (as in FIG. 18).

Following display of the user interface 1200, FIG. 18 illustrates a user interface 1300 of an automatic payment confirmation page presented to a user by a conversion server for initiating an automated financial account settings migration. An ACH transaction is an example of an automatic payment. The user interface 1300 includes a listing 1302 which includes various details of each of the automatic payment operations detected during analysis of the existing accounts of the customer by the migration server (in conjunction with analysis operation 658 of FIG. 8B). The listing 1302 includes information associated with each automatic payment listing, including a name of the entity triggering the automatic payment request, an account number with which the automatic payment is connected, a last payment, a payment amount, and occurrences over the past 12 month period. The listing includes a selection button associated with each entry to allow the user to select one or more of the automatic payment transactions to be migrated. A cancel button 1304 cancels billpay migration, while a switch button 1306 registers the selected automatic payment listings to be migrated. An add automatic payment button 1308 allows the user to add additional automatic payments that are not currently included in the listing 1302. These additional automatic payments may be automatic payments that were not detected during analysis of the existing accounts. In some embodiments, the user is presented with another user interface in which various information about the additional automatic payments may be entered.

FIG. 19 illustrates a user interface 1400 of a migration review page presented to a user by a conversion server for initiating an automated financial account settings migration. The user interface 1400 includes a listing of various types of automated funds transfers that are to be migrated to the target account associated with the migration process. In the embodiment shown, the user interface 1400 includes a billpay listing 1402 and an ACH listing 1404; however, as noted above, if other types of automated funds transfers were included, different listings could be included here as well. The user interface 1400 allows the user to view the various accounts to determine whether they wish to proceed with the migration to the target account. If so, the user interface includes an electronic signature field 1406 and a confirmation button 1408 allowing the user to electronically sign and confirm that they wish to perform the automated funds transfer migration to the target account.

After the migration server receives this confirmation, the migration server will trigger migration of the various existing accounts to a new target account. This can include importing billpay settings from existing accounts to the new account, and communicating with the selected third parties submitting ACH requests against and direct deposits into the preexisting accounts, to notify those third parties to, in the future, use a different target institution and routing number for those ACH transactions and direct deposits. Optionally, the migration server can also trigger transfer of some or all of the user funds included in the existing accounts to the target account. Such functionality can be as described above in connection with FIG. 8B.

FIG. 20 illustrates a user interface 1420 of a migration request form preview page presented to a user by a conversion server for initiating an automated financial account. The user interface 1420 can be used to review a migration requested form generated by the migration notification module 222 (illustrated and described with respect to FIG. 3 above). The user interface 1420 may be displayed as a pop-up after a particular automatic payment or direct deposit account is selected for migration. In some embodiments, the user interface 1420 is displayed before the user is prompted to electronically sign the request form for migrating an ACH payment or direct deposit. The user interface 1420 includes a preview panel 1422. The preview panel 1422 displays the draft migration request form (or notice) that has been generated. In this example, the notice includes a listing 1424 of personal information about accountholder that has been filled in by the conversion server. In this example, the notice also includes a listing 1426 of information about the target financial account that has been filled in by the conversion server. Additionally, the notice includes a signature line 1428 that has not yet been signed. The user interface 1420 also includes a sign button 1430 to sign the notice, an edit button 1432 to edit the information in the notice, and a cancel button 1434 to cancel the signing of the notice.

Figure 21:
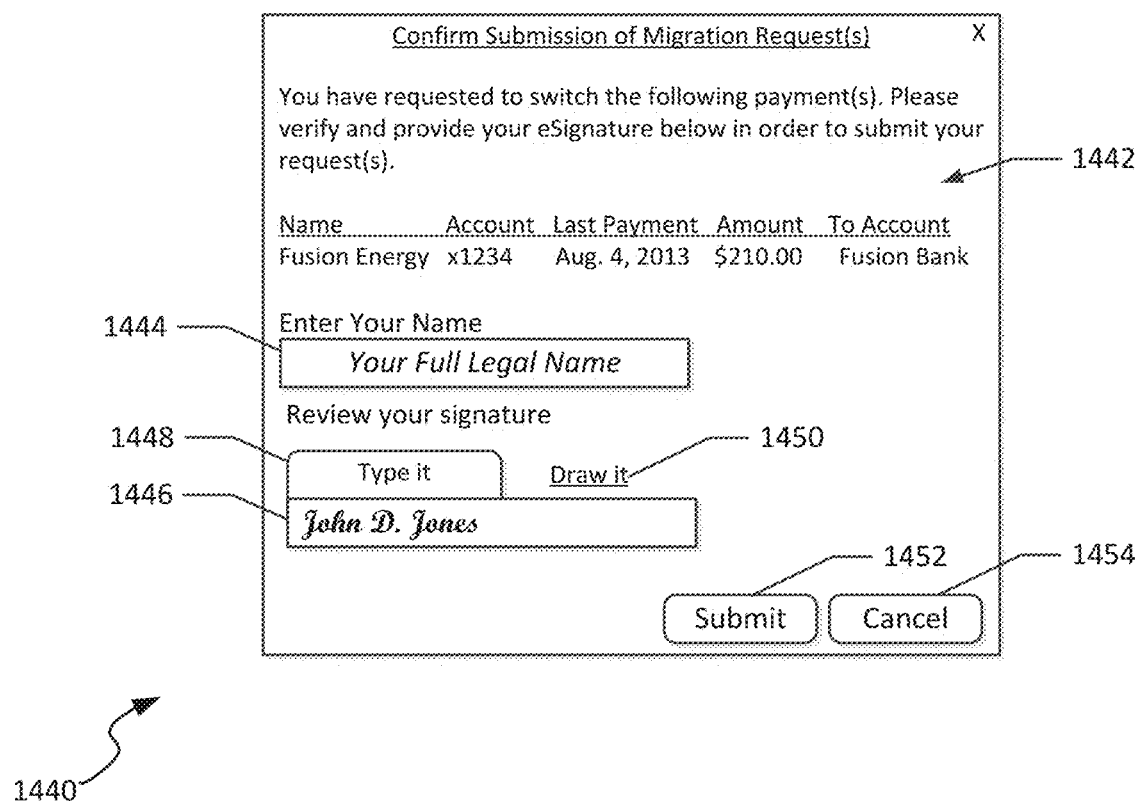
FIG. 21 is a schematic user interface of a confirmation and signature entry page presented to a user by a conversion server for initiating an automated financial account settings migration, according to an example embodiment.

FIG. 21 illustrates a user interface 1440 of a confirmation and signature entry page presented to a user by a conversion server for initiating an automated financial account settings migration. The user interface 1440 may be displayed as a pop-up over the user interface 1420 (illustrated an described with respect to FIG. 20) when the sign button 1430 is activated. The user interface 1440 may be used to approve and electronically sign one or more migration requests (notices to third-party entities). The user interface 1440 includes a listing 1442 of transactions that can be approved and signed. The user interface 1440 also includes a field 1444 for the user to type in his or her full legal name, which may be used to generate an electronic signature. The user interface 1440 includes an electronic signature preview field 1446, which displays the electronic signature. The user interface 1440 also includes a type it button 1448 and a draw it button 1450 that can be used to specify how the electronic signature is generated. When the type it button 1448 is activated, the electronic signature is generated from the legal name entered in field 1444. When the draw it button 1450 is activated, the electronic signature is generated from a drawing (such as a series of movements with a mouse) provided by the user. The user interface 1440 also includes a submit button 1452 for approving and submitting the electronic signature. Additionally, the user interface 1440 includes a cancel button 1454 to cancel approval and signature of the migration of the associated transactions.

Figure 22:
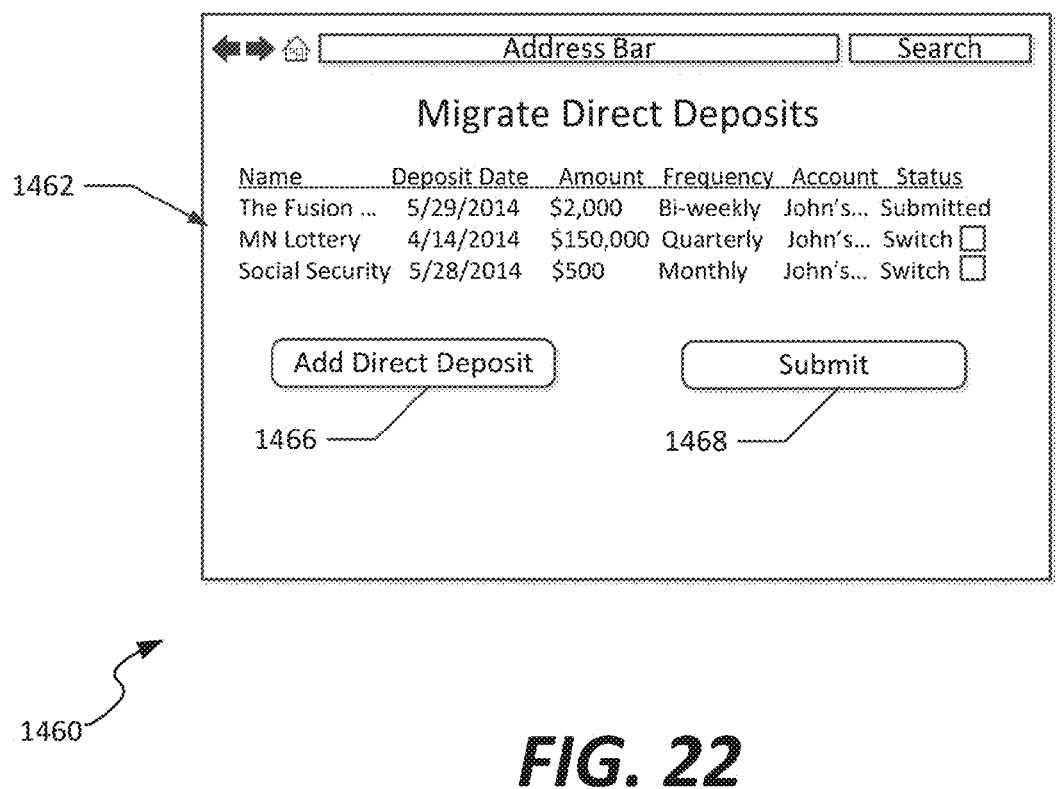
FIG. 22 is a schematic user interface of a direct deposit confirmation page presented to a user by a conversion server for initiating an automated financial account settings migration, according to an example embodiment.

FIG. 22 illustrates a user interface 1460 of a direct deposit confirmation page presented to a user by a conversion server for initiating an automated financial account settings migration. The user interface 1460 includes a listing 1462 which includes various details of each of the direct deposit operations detected during analysis of the existing accounts of the customer by the migration server (in conjunction with analysis operation 658 of FIG. 8B). The listing 1462 includes information associated with each direct deposit, including a name of the entity making the direct deposit, a last deposit date, a deposit amount, a frequency with which the deposit has occurred, the account the deposit is current being made to, and a status relating to migration of the deposit. The status of a deposit may be shown as submitted to indicate the deposit has been submitted for migration. Alternatively, the status of a deposit may be shown as switch to indicate that the user may elect to switch the deposit. The listing 1462 includes a selection button (or box) associated with each entry that has a status of switch to allow the user to select one or more of the direct deposit transactions to be migrated. A submit button 1468 registers the selected direct deposit listings to be migrated. An add direct deposit button 1466 allows the user to add additional direct deposits that are not currently included in the listing 1462. In some embodiments, the user is presented with another user interface in which various information about the additional direct deposits may be entered.

FIG. 23 illustrates a user interface 1480 of an account closures review page presented to a user by a conversion server for initiating an automated financial account settings migration. The user interface 1480 includes a listing 1482 which includes various details of each of the existing accounts associated with the migration (such as those accounts entered using the user interfaces described with respect to FIGS. 12 and 14-16). The listing 1482 includes information associated with each existing account, including the name of the financial institution where the account is held, a nickname for the account, an account number, an account type, a scheduled close date, and a closure status. The status of an account closure may be shown as submitted to indicate the closure has been submitted. Alternatively, the status of an account closure may be shown as switch to indicate that the user may elect to switch the deposit. The listing 1482 includes a selection button or box (not shown) associated with each entry that has a status of switch to allow the user to select one or more of the accounts for closure. A submit button 1484 registers the selected account listings to be closed.

After the migration is triggered, a customer may wish to view the status of migration of various automated funds transfers that were selected for migration. As such, FIG. 24 illustrates a user interface 1500 of a status notification page presented to a user by a conversion server for initiating an automated financial account settings migration. The user interface 1500 includes a contact entry field 1502 in which the customer can enter an email address (or alternatively a phone number or other contact information) at which the customer can receive notifications when various funds transfers have been migrated. A completion and status button completes the customer's involvement in the migration process, and takes that user to a user interface 1600 showing migration status for the target account according to the selected settings as illustrated in FIGS. 10-24.

As seen in FIG. 25, a user interface 1600 includes a migration status page presented to a user by a conversion server for initiating an automated financial account settings migration. The user interface includes a plurality of listings of various types of automated funds transfers, and notes the status of the migration of the settings associated with those scheduled, automated funds transfers. In the embodiment shown, the user interface 1600 includes a billpay listing 1602 showing completed migration of billpay settings to the target account. The user interface 1600 also includes a listing 1604 of ACH transactions that have successfully been migrated to the target account, and a further listing 1606 of ACH transactions that remain pending (e.g., in case the migration server has not yet received confirmation from either the financial institution associated with the target account or the third party issuing the ACH transaction request that the ACH transaction has successfully been migrated to the target account. A logout button 1608 causes the customer to exit the system provided by the migration server, and can optionally return the customer to the user interface 700 of FIG. 10, to initiate a further migration based on a different switch tracking number, or to track the status of the current migration using the same switch tracking number.

Figure 26:
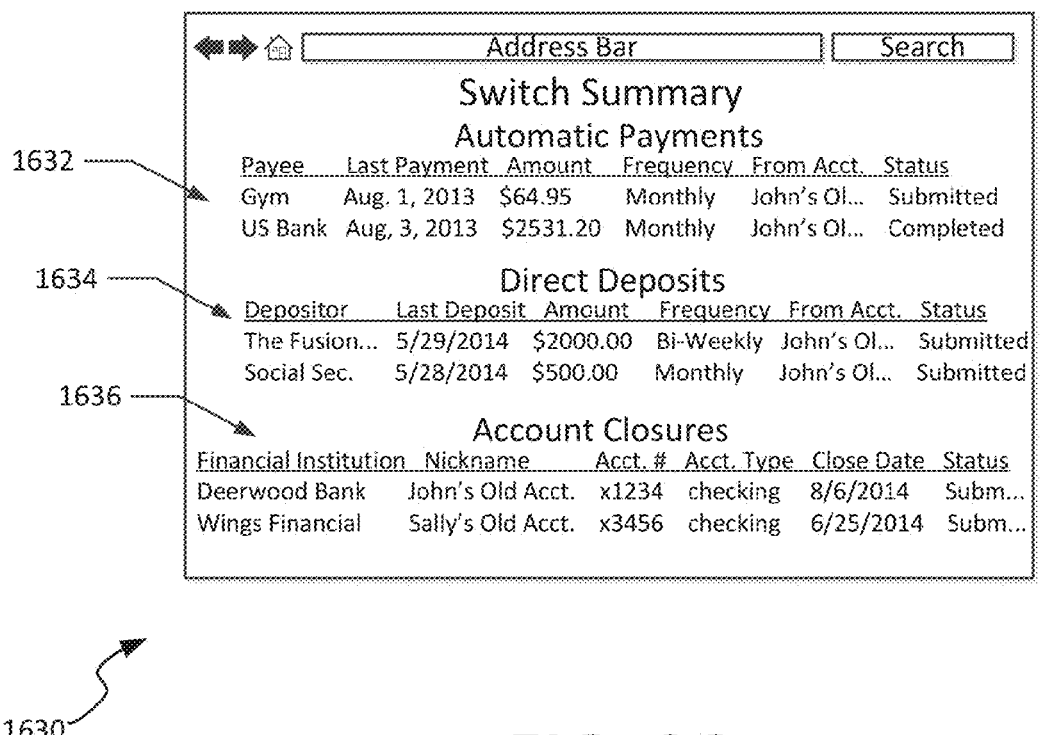
FIG. 26 is a schematic user interface of a switch summary page presented to a user by a conversion server for initiating an automated financial account settings migration, according to an example embodiment.

FIG. 26 illustrates a user interface 1630 of a switch summary page presented to a user by a conversion server for initiating an automated financial account settings migration. The user interface 1630 includes a listing 1632 of automatic payments that includes various information about the automatic payments, a listing 1634 of direct deposits that includes various information about the direct deposits, and a listing 1636 of account closures that includes various information about the accounts. Each of the listings 1632, 1634, and 1636 also includes a status field to indicate the status of a particular entry in the listings. The status may be displayed as submitted to indicate the switch or closure has been submitted. The status may be displayed as completed to indicate the switch or closure has been completed. Additionally, the status may be display with a different value to indicate, for example, that the switch or closure has not yet been submitted by the user.

It is noted that the various user interfaces disclosed above in connection with FIGS. 10-26 may be displayed in alternative orders, in accordance with the present disclosure. For example, FIGS. 17 and 18 could be presented in reverse order, allowing for customers to review ACH transactions prior to billpay transactions. Other reordering of such user interfaces into alternative sequences is possible as well.

Furthermore, and referring to the systems and methods of FIGS. 1-26 generally, a number of advantages are provided by the automated migration features discussed herein. For example, it assists in guiding a user through a migration to a new account, while avoiding requiring the customer or account holder to contact all of the ACH entities associated with an account. Furthermore, because the systems and methods include analysis of transactions associated with existing accounts, rather than simply reviewing settings for those existing accounts, sporadic or rare ACH transactions can be detected and captured, ensuring that no fund withdrawal requests are made against an account that either has had all funds withdrawn or has been closed. Additionally, the systems and methods of the present disclosure allow for increased speed and simplicity of account migration, and can be used by a variety of different financial institutions concurrently to cause migration of funds transfer data and other account settings concurrently, without requiring each institution to separately implement such a solution. Additional advantages are present as well, and are apparent from the above disclosure and the foregoing claims.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A system for migrating financial accounts for an accountholder from existing financial accounts at first party financial institutions to target financial accounts at second party financial institutions and notifying third-party payees of the migration, the system comprising:
   a migration server including:
      a third-party interface directory, the directory including a biller database storing a plurality of forms received from a plurality of third-party payees useable to authorize migration of automated payments initiated by the third-party payees from an existing financial account associated with an accountholder to a target financial account and contact information associated with the plurality of third-party payees, the existing financial account being associated with a first financial institution and the target financial account being associated with a second financial institution different from the first financial institution, wherein the forms have different arrangements and sets of fields based on the associated third-party payee;
      a web interface hosted by the migration server and configured to receive identification and login information associated with the existing financial account, and login information associated with the target financial account;
      a transaction analysis module configured to automatically parse transaction histories associated with the existing financial account associated with the accountholder to identify a plurality of third parties from among the plurality of third-party payees that have each initiated at least one recurring third-party initiated electronic funds transfer transaction with the existing financial account, the transaction histories including transactions occurring before the receiving of the identification and login information associated with the existing financial account, wherein automatically parsing the transaction histories includes for each of the plurality of identified third parties determining an amount of funds, on average, transferred in response to the at least one recurring third-party initiated electronic funds transfer transaction;
      a notification module configured to generate a plurality of notifications, including a notification for each of the plurality of identified third parties, by:
         automatically selecting a form associated with each of the plurality of identified third parties from the plurality of forms; and
         automatically generating a separate notification for each of the identified third parties based on notification data associated with the plurality of identified third parties stored in the third-party interface directory and information associated with the target financial account, wherein the notification module generates the notification by automatically populating fields of the selected form associated with each of the plurality of identified third parties with data about the accountholder;
      a second web interface generated by the migration server and presented to the accountholder associated with the existing financial account, the web interface operable to receive an electronic signature of the accountholder to be applied to each of the plurality of generated notifications;
      a migration component comprising computer-executable instructions executable on the migration server to upon receiving confirmation from the accountholder, initiate a migration of recurring third-party initiated electronic funds transfer transactions associated with the plurality of identified third parties, by:
         electronically transmitting the plurality of generated notifications to the plurality of identified third parties without requiring the generated notifications passing through the accountholder;
         determining an amount of funds available for transfer from the existing financial account to the target financial account and an amount of funds to be retained in the existing financial account for a period of time after initiation of the migration, the amount of funds to be retained being based on an expected amount of funds required in the existing financial account for recurring third-party initiated electronic funds transfer transactions associated with the plurality of identified third parties likely to occur within a predetermined amount of time after initiation of the migration, wherein the period of time exceeds the predetermined amount of time; and
         initiating a transfer from the existing financial account to the target financial account of the amount of funds available for transfer;

a switch tracking module comprising computer-executable instructions executable on the migration server to:
- generate a migration alert based on the transmitted plurality of generated notifications that includes a customized link, which is selectable to view a migration status for the accountholder;
- format the migration alert based on contact information provided by the accountholder;
- transmit the formatted migration alert to a remote computing device over a wireless communication network,
- wherein the formatted migration alert includes the customized link to the migration server;
- upon connection of the remote computing device to the migration server via the customized link, generating for display on the remote computing device a migration status report that is specific to the accountholder, including:
  - a completed list of third-party initiated electronic funds transfer transactions that have been successfully migrated for the accountholder; and
  - a pending list of third-party initiated electronic funds transfer transactions that are pending for the accountholder.

2. The system of claim 1, wherein the information associated with the target financial account comprises a bank routing number and an account number.

3. The system of claim 1, wherein the third-party interface directory comprises tables in a database.

4. The system of claim 1, wherein the third-party interface directory is maintained within a file system of the migration server.

5. The system of claim 1, wherein the at least one recurring third-party initiated electronic funds transfer transaction is an Automated Clearing House (ACH) transaction or a direct deposit transaction.

6. The system of claim 1, wherein the migration server further comprises:
a migration confirmation module configured to display the identified plurality of third parties and receive a selection of one or more third parties from the plurality of third parties for migration to the target financial account.

7. The system of claim 6, wherein the migration server further comprises:
a third party migration database for tracking third party transaction migrations, the database including records associated with the selected one or more third parties, the records including a migration confirmation field for recording whether the migration for an associated third party has been confirmed.

8. The system of claim 1, wherein the notification module is configured to present the populated form to the accountholder for review and signature, the notification module being configured to receive an eSignature from the accountholder.

9. A method for managing automated migration of financial accounts for an accountholder from existing financial accounts at first party financial institutions to target financial accounts at second party financial institutions and notifying third-parties of the migration, the method comprising:
receiving identification and login information associated with an existing financial account at a migration server, the existing financial account being associated with one or more automated funds transfers;
receiving login information associated with a target financial account;
automatically parsing transaction histories associated with the existing financial account to identify one or more third parties that have each initiated at least one recurring third-party initiated electronic funds transfer transaction with the existing financial account, the transaction histories including transactions occurring before the receiving of the identification and login information associated with the existing financial account;
receiving at the migration server a selection by a user of one or more of the third parties;
receiving user authorization to initiate migration of the selected third parties, including receiving, via a web interface generated by the migration server and presented to the accountholder associated with the existing financial account, an electronic signature of the accountholder to be applied to each form associated with the identified third parties;
generating notifications for the selected third parties based on notification data associated with the third parties stored in a third-party interface directory and information associated with a target financial account, wherein generating notifications includes automatically selecting and populating fields of a different form stored in a biller database for each identified third party and applying the electronic signature of the accountholder to the form without requiring the form passing through the accountholder, the third-party interface directory including the biller database, and wherein the biller database includes forms received from the one or more third parties useable to authorize migration of automated payments by the third parties from an existing financial account associated with an accountholder to a target financial account, wherein the forms have different arrangements and sets of fields based on the associated third party;
initiating migration of the selected third parties to the target financial account by determining an amount of funds available for transfer from the existing financial account to the target financial account and an amount of funds to be retained in the existing financial account for a period of time after initiation of the migration, the amount of funds to be retained being based on an expected amount of funds required in the existing financial account for recurring third-party initiated electronic funds transfer transactions associated with the selected third parties likely to occur within a predetermined amount of time after initiation of the migration, wherein the period of time exceeds the predetermined amount of time, and initiating a transfer from the existing financial account to the target financial account of the amount of funds available for transfer;
generating a migration alert based on the generated notifications, wherein the migration alert includes a customized link that is selectable to view a migration status for the accountholder;
formatting the migration alert based on contact information provided by the accountholder;
transmitting the formatted migration alert to a remote computing device over a communication network, wherein the formatted migration alert includes the customized link; and
upon connection of the remote computing device to the migration server via the customized link, generating for display on the remote computing device a migration status report that is specific to the accountholder, including a completed list of third-party initiated electronic funds transfer transactions that have been successfully migrated for the accountholder and a pending list of third-party initiated electronic funds transfer transactions that are pending for the accountholder.

10. The method of claim 9, further comprising:
tracking the migration of the selected third parties in a database at the migration server, including tracking whether each of the third parties has confirmed the migration.

11. The method of claim 9, wherein the at least one recurring third-party initiated electronic funds transfer transaction initiated is an Automated Clearing House (ACH) transaction or a direct deposit transaction.

12. The method of claim 9, further comprising:
presenting the notification generated by populating a form to the accountholder for signing; and
transmitting the signed notification to the third party.

13. A system for migrating financial accounts for an accountholder from an existing financial account to a target financial account and notifying third-parties of the migration, the system comprising:
a migration server including:
  a web interface configured to receive identification and login information associated with an existing financial account associated with an accountholder and identification and login information associated with a target financial account;
  a transaction analysis module configured to automatically parse transaction histories associated with the existing financial account associated with the accountholder to identify a plurality of third parties that have each initiated at least one recurring third-party initiated electronic funds transfer transaction with the existing financial account, the transaction histories including transactions occurring before the receiving of the identification and login information associated with the existing financial account, wherein the at least one transaction is an Automated Clearing House (ACH) transaction or a direct deposit transaction, and wherein automatically parsing the transaction histories includes determining an amount of funds, on average, transferred in response to the at least one recurring third-party initiated electronic funds transfer transaction;
  a migration confirmation module configured to display the identified plurality of third parties and receive a selection of one or more third parties from the plurality of third parties for migration to the target financial account;
  a third-party interface directory, the directory including notification data associated with notifying one or more third parties of an account migration without requiring a notification to pass through the accountholder and a biller database storing forms received from the one or more third parties useable to authorize migration of automated payments by the third parties from an existing financial account associated with an accountholder to a target financial account, wherein the forms have different arrangements and sets of fields based on the associated third party;
  a notification module configured to generate a notification for the identified third party based on notification data associated with the identified third party stored in the third-party interface directory and information associated with a target financial account, wherein the information associated with the target financial account comprises a bank routing number and an account number, wherein the notification module generates the notification by automatically selecting and populating fields of a form stored in the biller database with data about the accountholder;
  a third party migration database for tracking third party transaction migrations, the database including records associated with the selected one or more third parties, the records including a migration confirmation field for recording whether the migration for an associated third party has been confirmed;
  a migration module configured to transfer funds from the existing financial account to the target financial account, wherein the migration module determines an amount of funds available for transfer from the existing financial account to the target financial account and an amount of funds to be retained in the existing financial account for a period of time after initiation of the migration, initiates a transfer from the existing financial account to the target financial account of the amount of funds available for transfer, and retains at least a portion of the funds in the existing financial account for a period of time after initiation of the migration to fulfill transactions likely to occur after initiation of the migration; the at least a portion of the funds determined based on the migration confirmation field in the records in the third party migration database; and
  a switch tracking module configured to:
    generate a migration alert based on the transmitted plurality of generated notifications, wherein the migration alert includes a customized link, which is selectable to view a migration status for the accountholder;
    format the migration alert based on contact information provided by the accountholder;
    transmit the formatted migration alert to a remote computing device over a wireless communication network, wherein the formatted migration alert includes the customized link to the migration server; and
    upon connection of the remote computing device to the migration server via the customized link, generating for display on the remote computing device a migration status report that is specific to the accountholder, including: a completed list of third-party initiated electronic funds transfer transactions that have been successfully migrated for the accountholder and a pending list of third-party initiated electronic funds transfer transactions that are pending for the accountholder,
  wherein the web interface is further configured to receive an electronic signature of the accountholder to be applied to each form associated with the identified third parties.

14. The system of claim 13, wherein the notification module generates the notification by populating a form with data about the accountholder, the form being associated with the identified third party, the notification module is configured to present the populated form to the accountholder for review and signature, and the notification module is configured to receive an eSignature from the accountholder.

15. The system of claim 1, wherein the formatted migration alert upon receipt activates an application on a remote computing device to display the formatted migration alert and enables connection via the customized link to the migration server over the Internet.

16. The system of claim 13, wherein the existing financial account is associated with a first financial institution; and wherein the target financial account is associated with a second financial institution different from the first institution.

\* \* \* \* \*